United States Patent [19]

Ebinuma et al.

[11] Patent Number: 4,893,137

[45] Date of Patent: Jan. 9, 1990

[54] RECORDING APPARATUS AND INK CARTRIDGE

[75] Inventors: Ryuichi Ebinuma, Kawasaki; Nobutoshi Mizusawa, Yamato; Yuji Chiba, Isehara, all of Japan

[73] Assignee: Canon Kabushiki Kaisha, Tokyo, Japan

[21] Appl. No.: 131,083

[22] Filed: Dec. 9, 1987

[30] Foreign Application Priority Data

| Dec. 10, 1986 [JP] | Japan | 61-292599/1986 |
| Dec. 10, 1986 [JP] | Japan | 61-292600/1986 |
| Dec. 10, 1986 [JP] | Japan | 61-292601/1986 |
| Dec. 25, 1986 [JP] | Japan | 61-307937/1986 |
| Dec. 25, 1986 [JP] | Japan | 61-307938/1986 |
| Dec. 25, 1986 [JP] | Japan | 61-307939/1986 |
| Dec. 25, 1986 [JP] | Japan | 61-307940/1986 |

[51] Int. Cl.$^4$ ............................................. G01D 15/00
[52] U.S. Cl. .................................. 346/134; 346/140 R; 346/145
[58] Field of Search .................. 219/364; 361/384; 346/134, 136, 140 R, 140 PD, 145

[56] References Cited

U.S. PATENT DOCUMENTS

| 4,559,543 | 12/1985 | Toganoh et al. | 346/140 R |
| 4,651,173 | 3/1987 | Ozawa et al. | 346/136 |
| 4,664,542 | 5/1987 | Tsugita | 361/384 |
| 4,692,778 | 9/1987 | Yoshimura et al. | 346/145 |
| 4,695,855 | 9/1987 | Ichihashi et al. | 346/145 |
| 4,698,650 | 10/1987 | Watanabe et al. | 346/134 |
| 4,704,620 | 11/1987 | Ichihashi et al. | 219/364 X |
| 4,737,801 | 4/1988 | Ichihashi et al. | 346/140 R |
| 4,748,459 | 5/1988 | Ichihashi et al. | 346/140 PD |

*Primary Examiner*—J. R. Scott
*Attorney, Agent, or Firm*—Fitzpatrick, Cella, Harper & Scinto

[57] ABSTRACT

A recording apparatus is provided with an upper unit having a recording head for discharging ink for effecting recording on a recording medium in response to information, and at least a portion of the electric circuit of the apparatus, a lower unit having a platen for maintaining the recording medium in the recording station by the recording head, the lower unit capable of being spaced apart relative to the upper unit, and a conveying member for conveying the recording medium to the recording station. The upper unit and the lower unit are capable of being spaced apart and opened in the recording station by the recording head.

59 Claims, 25 Drawing Sheets

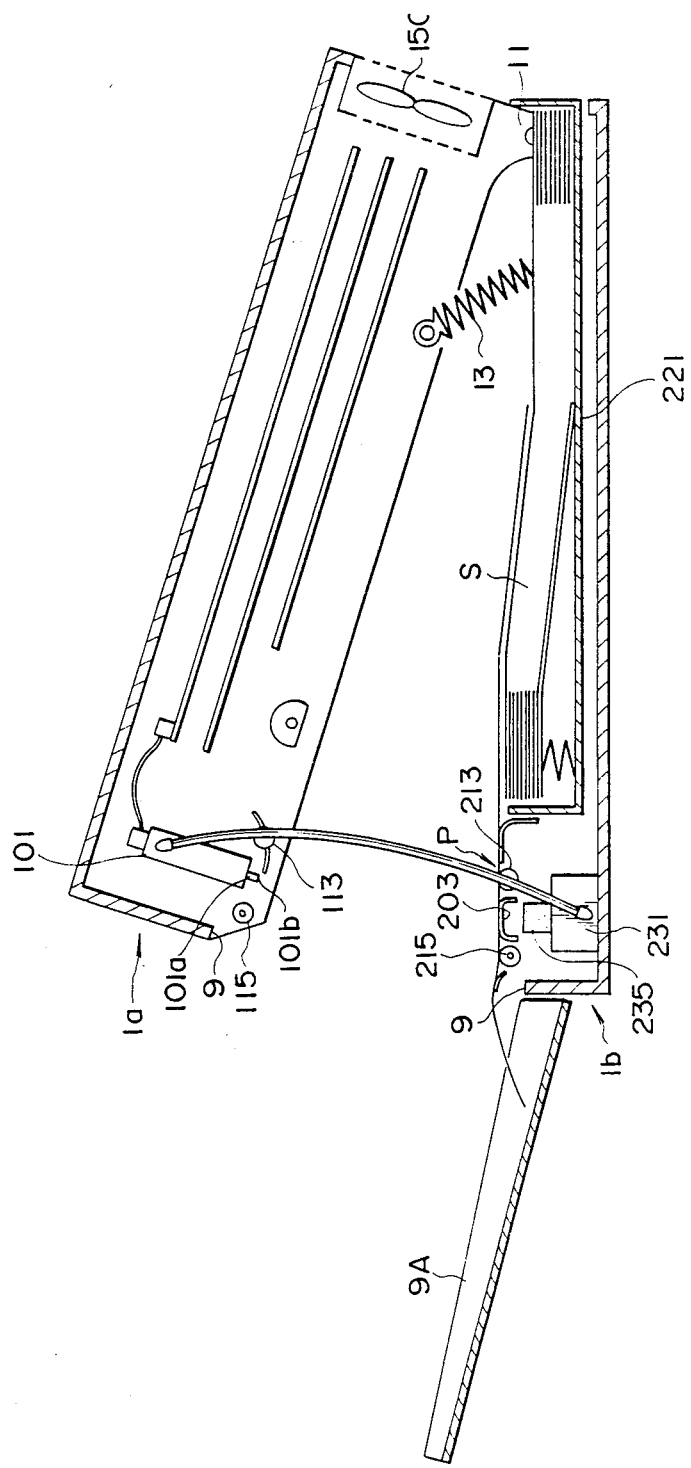

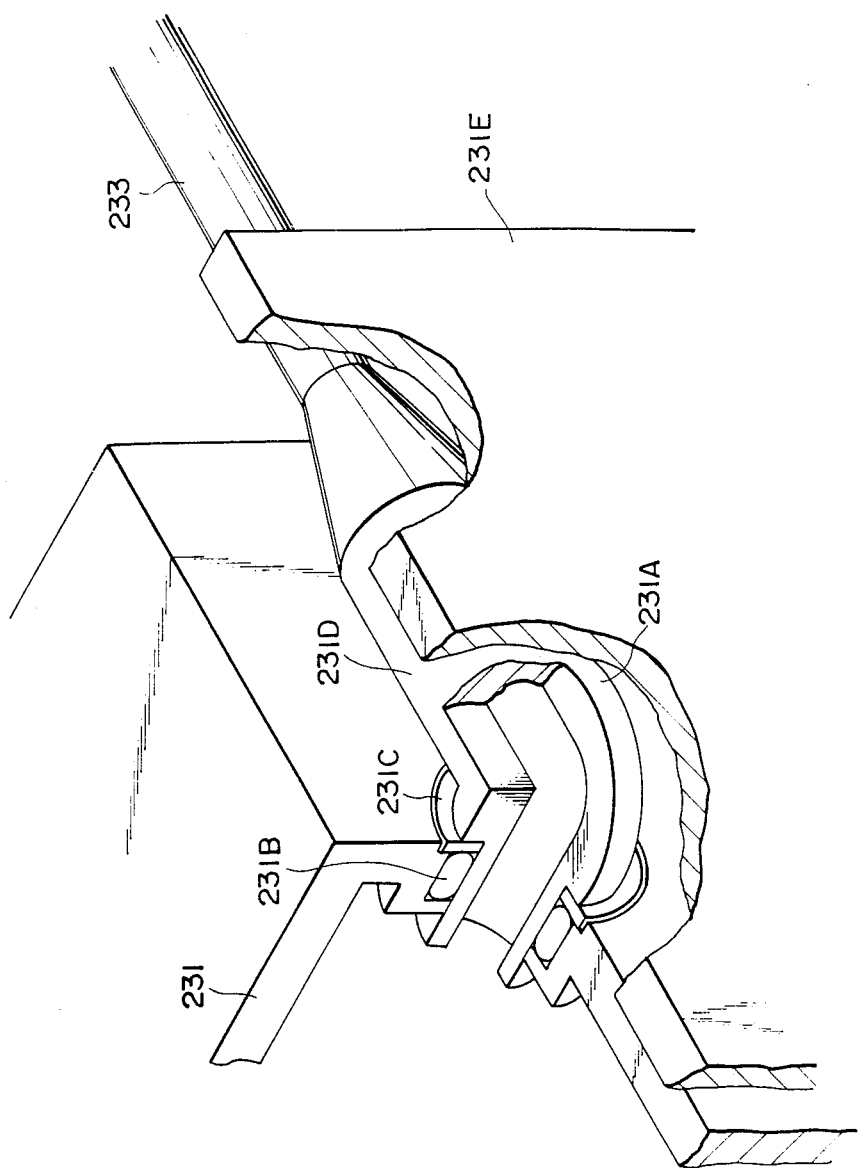

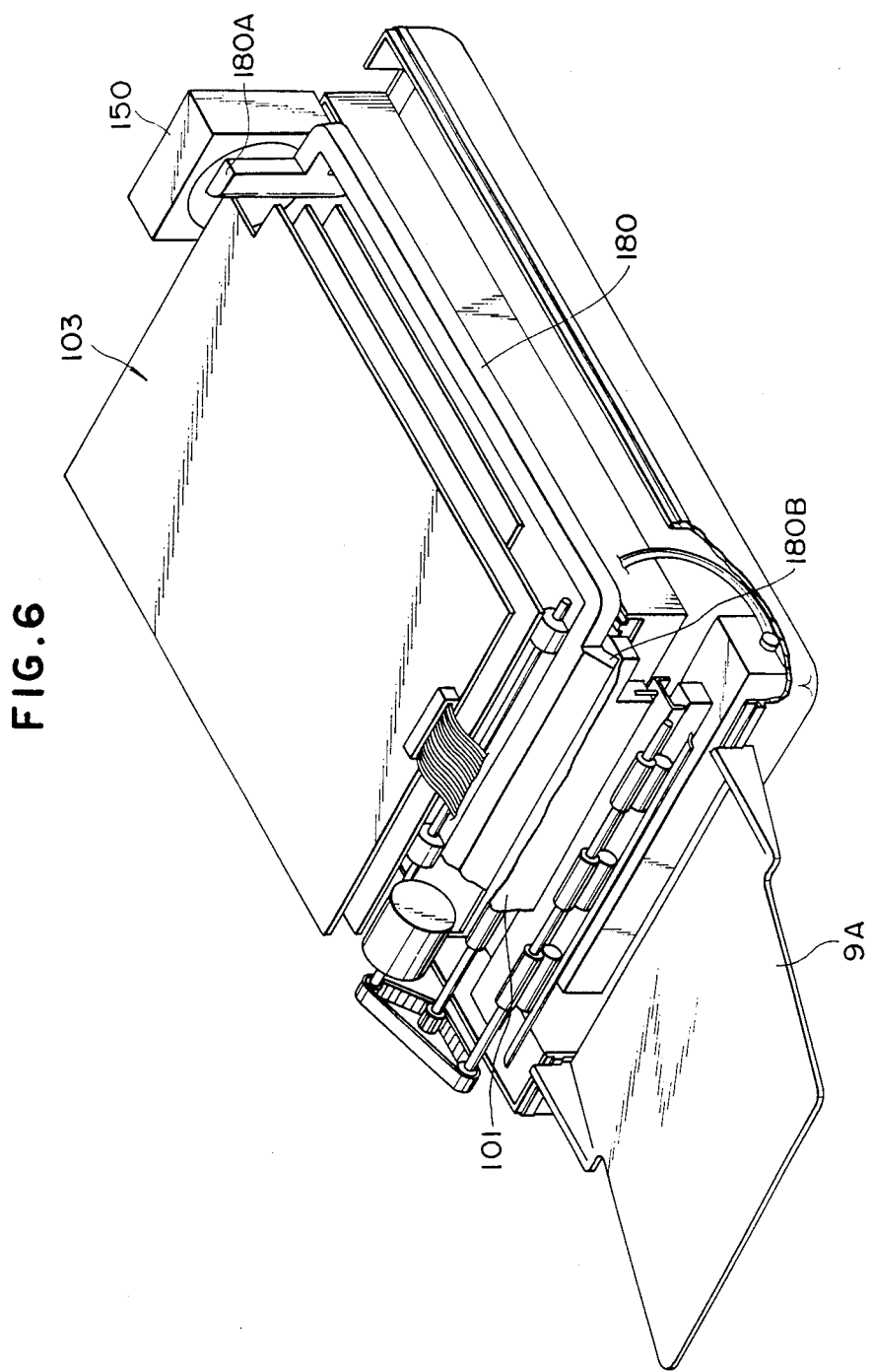

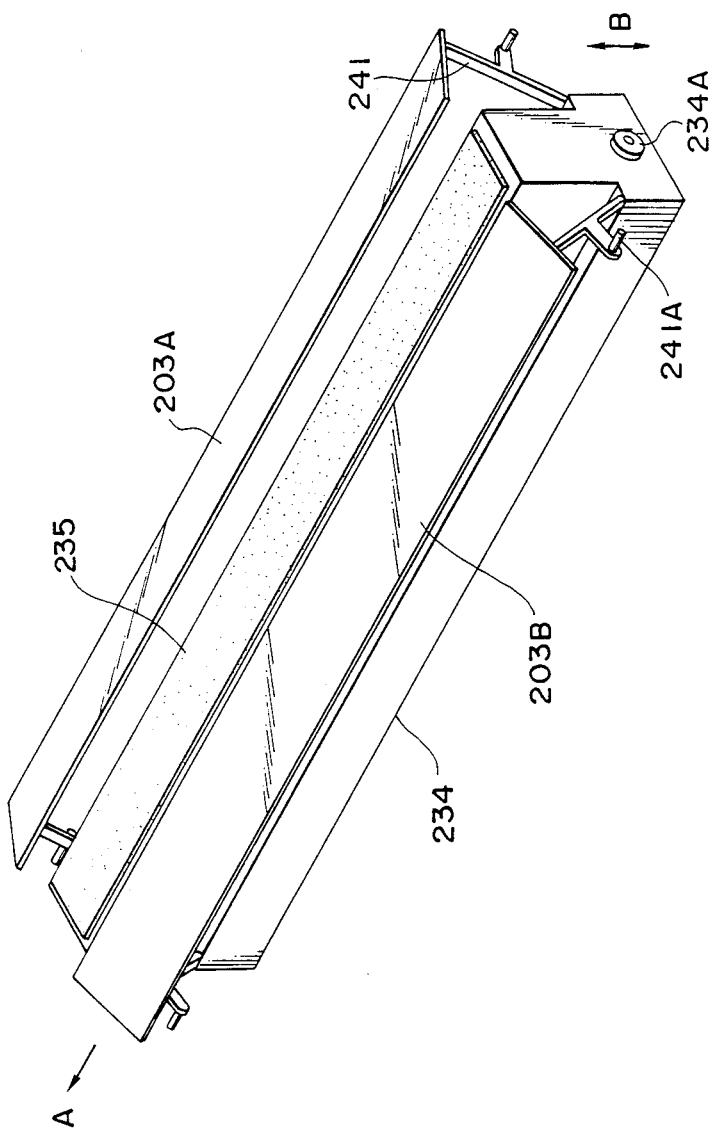

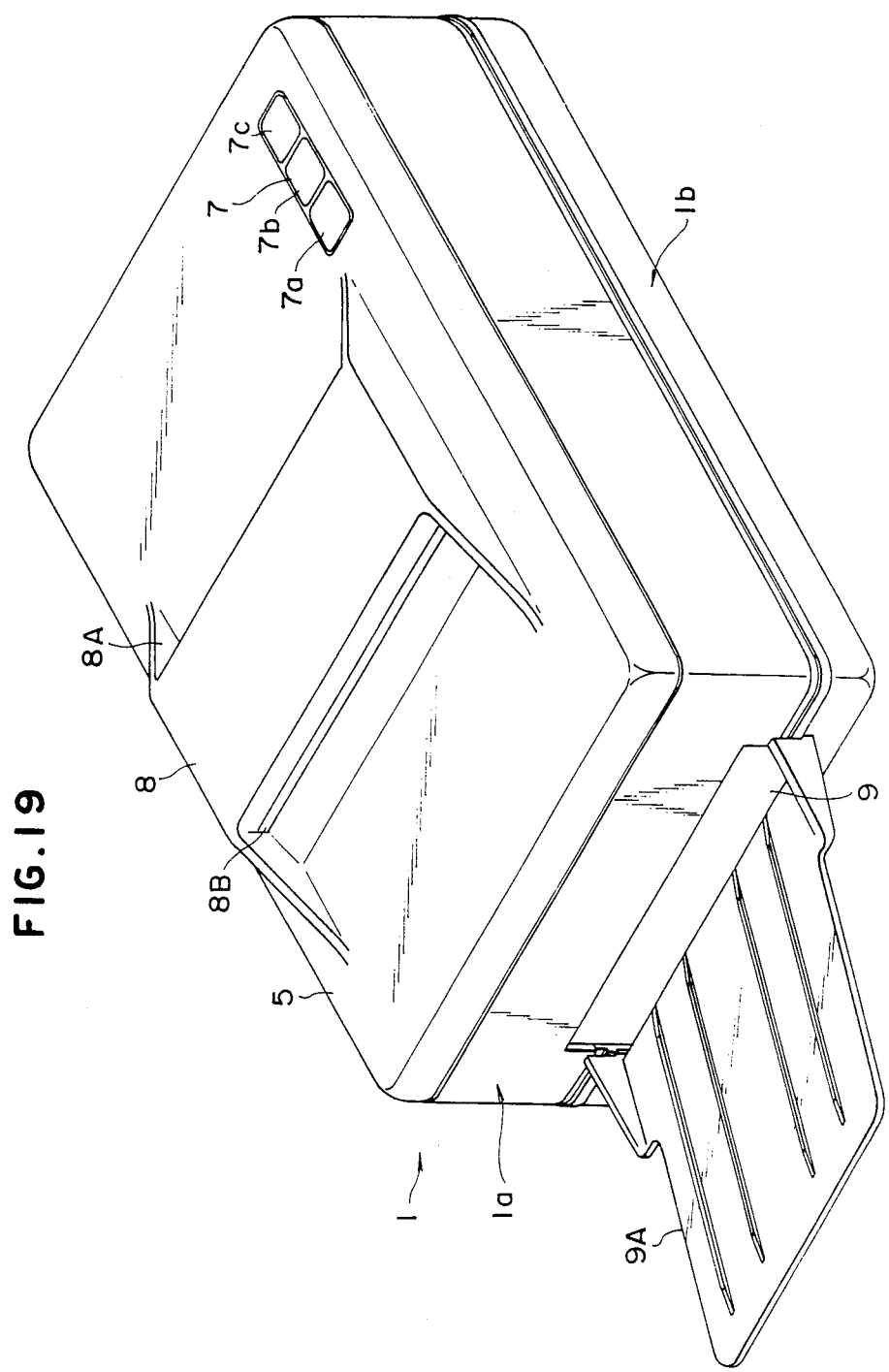

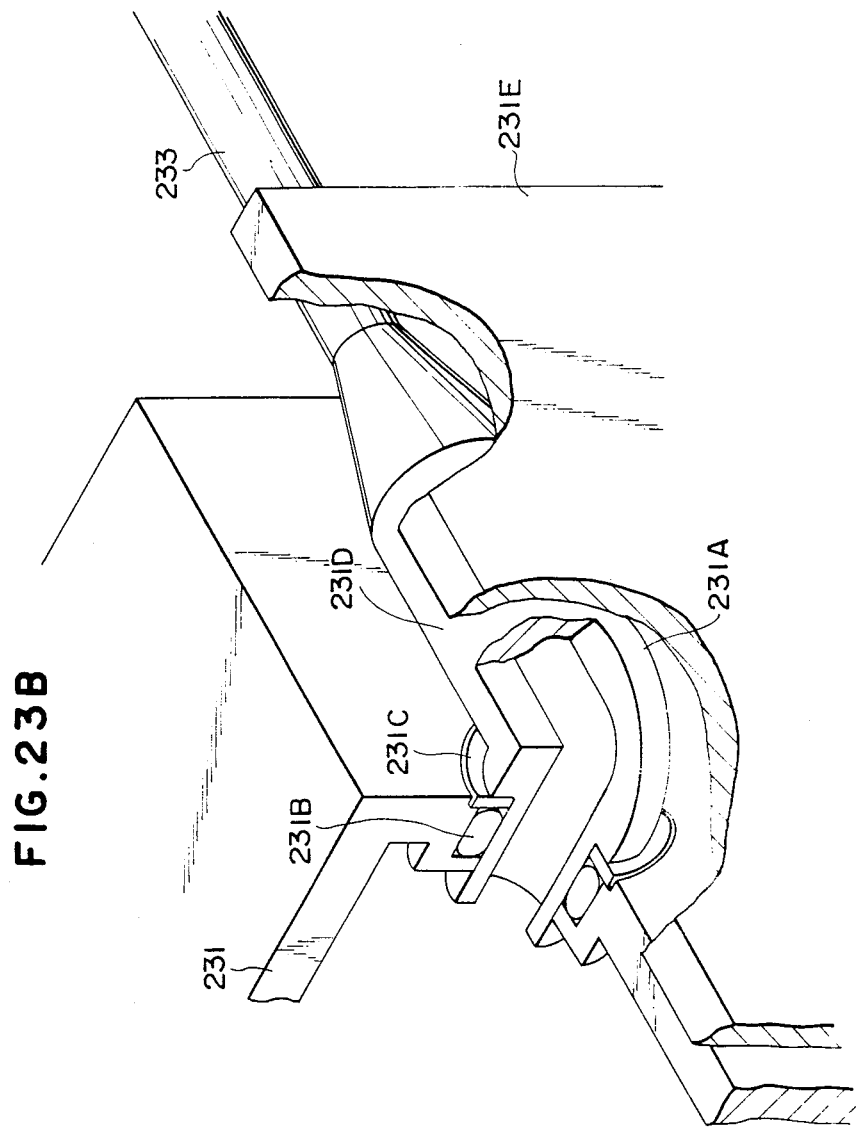

RECORDING APPARATUS AND INK CARTRIDGE

BACKGROUND OF THE INVENTION

1. Field of the Invention

This invention relates to a recording apparatus and an ink cartridge for use in the apparatus, and more particularly to a recording apparatus having an ink jet recording head using ink to effect recording (an ink jet recording apparatus).

2. Related Background Art

As recording means used in a recording apparatus, the ink jet recording system has numerous advantages such as very low noise during recording and capability of effecting recording on plain paper, and has been attracting more and more attention in recent years.

Also, a recording apparatus which reads image information from a medium (an original) bearing information and effects a series of image processing operations in which the image information is recorded on a recording medium such as paper is now an apparatus indispensable in the information processing system. Such a recording apparatus also has numerous advantages such as very low noise during recording and capability of effecting recording on plain paper. Therefore, ink jet recording systems have been attracting more and more attention.

Above all, the ink jet recording system called the on-demand type which effects ink discharge during recording by the utilization of either a piezoelectric element or a magnetostrictive element which is an electro-mechanical converting element or an electro-thermal converting element has great advantage in that it does not require means for collecting unnecessary ink and a high voltage source for deflection, because it consumes ink only when necessary for recording.

With the recent spread of so-called OA instruments, the requirement for compactness and higher recording speed of recording apparatuses as image forming apparatuses has been rising. Therefore, even ih recording apparatuses using the on-demand type ink jet recording system having various advantages, it is still strongly desired to introduce improvements to meet such requirements.

On the other hand, the ink jet recording apparatus, which generally uses liquid as a recording agent, may experience clogging or the like of ink in recording means such as a head and thus, improved operability of maintenance of the recording means is desired. Also, recording mediums such as paper may jam in the conveyance path and thus, improved operability of so-called jam treatment is desired.

Although the ink jet recording apparatus thus has various advantages, dust or paper powder of recording paper has adhered to the discharge ports of the recording head to cause clogging of such ports or cause mixing of bubbles with the interior of the discharge ports, or in the on-demand type ink jet recording apparatus, the frequent use of a number of nozzles arranged in the recording head is not uniform. Therefore, irregularity of discharge conditions has sometimes been caused by an increase in the viscosity of ink. Also, ink has sometimes adhered to a recording medium when it has remained on the end surface of the recording head in which the discharge ports open.

Therefore, in the ink jet recording apparatus, it is requisite to effect a suitable operation for eliminating these various factors which degrade the quality of recording (hereinafter referred to as the discharge restoring operation).

However, in an ink jet recording apparatus, particularly an ink jet recording apparatus having a so-called full multi-type recording head in which discharge ports are arranged in a range corresponding to the width of the recording medium, a platen for controlling the recording surface is provided in proximately opposed relationship with the discharge ports over the full range ih which the discharge ports are arranged. Therefore, it has been difficult to secure a large work space when effecting the discharge restoring operation, without making the apparatus bulky.

That is, in the discharge restoring operation as described above, it is generally practiced as an example to effect discharge with a restoring member joined or proximately opposed to the discharge ports.

However, as mentioned above, in the ink jet recording apparatus having a full multi-type recording head, the platen for controlling the recording surface is provided in proximately opposed relationship with the discharge ports over the full range in which the discharge ports are arranged, and this gives rise to the necessity of replacing the platen with the restoring member when effecting the discharge restoring operation.

An apparatus in which, when effecting the discharge restoring operation, the platen is greatly spaced apart from the recording head and in this state, the restoring member can be opposed to the recording head (for example, an apparatus disclosed in our Japanese Patent Application No. 65103/1985 (U.S. patent application Ser. No. 844,132 now U.S. Pat. No. 4,692,778)) has been proposed. However, to contribute to further compactness of the recording apparatus, it is desirable to make the range of movement of the platen or the restoring member small.

The restoring member receives ink during the discharge restoring operation, etc. and therefore, it is desirable to provide it with an ink absorbing member formed of a water-absorbent porous material. However, such an ink absorbing member is limited in its ink absorbing capacity (the amount of ink absorbed) and therefore, it is preferable to interchange it at suitable chances.

On the other hand, another member required to be interchanged in the ink jet recording apparatus is an ink tank for ink supply if the ink tank is of the interchangeable type. In the ink jet recording apparatus, when the interchange of both of the restoring member and the ink tank becomes necessary, two stages of discrete operations must be performed during the use.

SUMMARY OF THE INVENTION

In view of the above-noted problems, it is an object of the present invention to provide a recording apparatus which is compact and moreover improved in the operability of maintenance of recording means and the operability of jam treatment.

It is also an object of the present invention to provide a recording apparatus which is compact and moreover appropriately designed such that various parts including an electric circuit are reliably protected from ink mist, etc.

It is also an object of the present invention to provide a recording apparatus of such a construction in which during the discharge restoring operation, the displacement of a platen is minimized and moreover a large work space can be secured.

It is a further object of the present invention to provide a recording apparatus in which a simple and reliable discharge restoring operation can be performed without requiring great displacement of a platen and a restoring member.

It is also an object of the present invention to provide a recording apparatus in which a simple and reliable discharge restoring operation can be performed without requiring great displacement of a platen and a restoring member and the interchanging work is made simple.

In addition, it is an object of the present invention to provide a recording apparatus in which recording means and reading means are made integral with each other and the ink jet recording system is used for the recording means to make the most of the advantages thereof and which is compact and high in operability and moreover improved in the operability of maintenance of the recording means and the operability of jam treatment.

It is an object of the present invention to provide a recording apparatus being characterized by the provision of an upper unit having recording means having ink discharge ports for discharging ink for effecting recording on the recording medium in response to information, and at least a portion of the electric circuit means of the apparatus, a lower unit having a platen for maintaining the recording medium in the recording station by the recording means, said lower unit being capable of being spaced apart relative to said upper unit, and conveying means for conveying said recording medium to said recording station, said upper unit and said lower unit being capable of being spaced apart and opened in the recording station by said recording means.

It is an object of the present invention to provide a recording apparatus with a first unit having recording means for discharging ink for effecting recording on the recording medium in response to information, a second unit having a platen for maintaining said recording medium in the recording station by said recording means, and ink storing means storing therein the ink to be supplied to said recording means, said second unit being capable of being spaced apart relative to said first unit, conveying means for conveying said recording medium to said recording station, and an ink supply connecting member displaceable in response to the spacing apart of said first unit and said second unit and connecting said recording means to said ink storing means to supply the ink from said ink storing means to said recording means, said first unit and said second unit being capable of being spaced apart and opened in the recording station by said recording means.

It is an object of the present invention to provide a recording apparatus having a recording head for discharging ink, blower means for introducing air into the apparatus, and an opening for directing the introduced air to the outside of the apparatus, said opening being provided adjacent to said recording head.

It is an object of the present invention to provide a recording apparatus having a fan for said blower means to introduce the air, and a member for directing the introduced air to said recording head, said opening being provided adjacent to said recording head and above a containing member containing therein various parts of the apparatus including said recording head.

It is an object of the present invention to provide a recording apparatus provided with a recording head in which ink discharge ports are arranged, a platen provided in opposed relationship with the discharge ports of said recording head during recording, a cartridge removably provided in the body of the apparatus and integrally holding storing means storing therein ink to be supplied to said recording head, a receiving member for receiving the ink from said discharge ports in a state joined or proximate to said discharge ports, and supporting said platen so as to be capable of leaving a position opposed to said discharge ports, and drive means for driving said cartridge to cause said platen to leave said opposed position and cause said receiving member to be joined or proximate to said discharge ports.

It is also an object of the present invention to provide a recording apparatus provided with a recording head in which ink discharge ports are arranged, a cartridge removably provided in the body of the apparatus and integrally holding a platen opposed to the discharge ports of said recording head during recording, storing means storing therein ink to be supplied to said recording head, and a receiving member for receiving the ink from said discharge ports in a state joined or proximate to said discharge ports, and supporting said platen so as to be capable of leaving a position opposed to said discharge ports, and drive means for driving said cartridge to cause said platen to leave said opposed position and cause said receiving member to be joined or proximate to said discharge ports.

It is an object of the present invention to provide a recording apparatus provided with a recording head in which ink discharge ports are arranged, a platen provided in opposed relationship with the discharge ports of said recording head, holding means for holding said platen so as to be capable of leaving a position opposed to said discharge ports, and drive means for driving said holding means to cause said platen to leave said opposed position.

It is an object of the present invention to provide a recording apparatus provided with a recording head in which ink discharge ports are arranged, a platen provided in opposed relationship with the discharge ports of said recording head, an opposing member capable of being opposed to said discharge ports, and holding means for holding said platen so as to be capable of leaving a position opposed to said discharge ports and causing said opposing member to be opposed to said discharge ports in association with said leaving.

It is also an object of the present invention to provide a cartridge having a receiving member capable of receiving ink, and a movable platen member capable of providing a platen when mounted on the apparatus, and covering said receiving member.

It is also an object of the present invention to provide an ink cartridge provided with an ink tank storing ink therein, a receiving member for receiving the ink, and a movable protective member covering said receiving member.

It is also an object of the present invention to provide a recording apparatus characterized by the provision of an upper unit having recording means having discharge ports for discharging ink for effecting recording on a recording medium in response to information, reading means for reading image information from a medium bearing an image, and at least a portion of the electric circuit means of the apparatus, a lower unit having a platen for maintaining the recording medium in the recording station by said recording means, said lower unit being capable of being spaced apart relative to said upper unit, and conveying means for conveying the recording medium to the recording station, said upper unit and said lower unit being capable of being spaced apart and opened in the recording station by said recording means.

It is also an object of the present invention to provide a recording apparatus characterized by the provision of a first unit having recording means having ink discharge ports for discharging ink for effecting recording on a recording medium in response to information, and reading means for reading image information from a medium bearing an image, a second unit having a platen for maintaining the recording medium in the recording station by said recording means, and ink storing means storing therein ink to be supplied to said recording means, said second unit being capable of being spaced apart relative to said first unit, conveying means for conveying the recording medium to the recording station, and an ink supply connecting member displaceable in response to the spacing apart of said first unit and second unit and connecting said recording means to said ink storing means to supply the ink from said ink storing means to said recording means, said first unit and said second unit being capable of being spaced apart and opened in the recording station by said recording means.

According to the present invention which achieves the above objects, the upper unit and the lower unit are capable of being spaced apart and opened in the recording station, whereby the space available to effect the maintenance of the recording means can be made large and the conveyance path can be opened.

Also, according to the present invention, the first unit and the second unit are capable of being spaced apart and opened in the recording station, whereby the space available to effect the maintenance of the recording means can be made large and the conveyance path can be opened.

Also, since the ink supply connecting member is displaceable, the spacing apart of the first and second units is permitted, for example, without involving the separation of the ink supplying system.

Also, according to the present invention, even when ink mist or the like is caused during ink discharge, it is quickly carried out of the apparatus through an opening and thus, ink mist or the like does not adversely affect various parts of the apparatus.

Also, according to the present invention, if a driving member is suitably driven in the discharge restoring operation, the platen will leave the position opposed to the recording head and therefore, a work space will be secured near the recording head.

Also, according to the present invention, the platen and the joining member are operatively associated with each other and replace each other in position to become opposed to the discharge ports, so that where, for example, the joining member is a restoring member, a reliable discharge restoring operation becomes possible without involving great displacement of the platen and joining member.

Also, according to the present invention, the platen and the receiving member are operatively associated with each other and replace each other in position to become opposed to the discharge ports and therefore, without involving their great displacement, the discharge restoring operation of the recording head becomes possible. Also, since the storing means and the receiving member are provided as a unit in the holding member, the interchanging work is simplified and saving of the space can be achieved.

Further, according to the present invention, the platen can be used also as a lid member for covering the receiving member when the cartridge is removed from the apparatus body.

In addition, according to the present invention, the ink jet recording means and the image input means are constructed integrally with each other, whereby there can be provided a recording apparatus which is compact and high in operability while making the most of the advantages of the ink jet recording means. Also, the respective units are capable of being spaced apart and opened in the recording station, whereby the space available to effect the maintenance of the recording means can be made large and the conveyance path can be opened. Further, according to the present invention, the ink supply connecting member is displaceable and thus, the spacing apart of the units is permitted, for example, without involving the separation of the ink supplying system.

BRIEF DESCRIPTION OF THE DRAWINGS

FIG. 4 is a side sectional view showing the apparatus according to Embodiment 1 with the body unit portion and the paper supply portion thereof separated from each other.

FIGS. 5A and 5B respectively are an illustration showing an example of the construction of the connecting portion between a recording head and a supply tube in Embodiment 1 and between an ink tank and the supply tube and a perspective view showing the essential portions thereof.

FIG. 6 is a perspective view showing another embodiment of the present invention.

FIG. 17 is a perspective view showing another example of the construction of the essential portions of the present invention.

FIG. 19 is a perspective view showing an embodiment (Embodiment 2) of a recording apparatus provided with image reading means to which the present invention is applicable.

FIGS. 23A and 23B respectively are an illustration showing an example of the construction of the connecting portion between a recording head and a supply tube in Embodiment 2 and between an ink tank and the supply tube and a perspective view showing the essential portions thereof.

DESCRIPTION OF THE PREFERRED EMBODIMENTS

The invention will hereinafter be described in detail with reference to the drawings.

EMBODIMENT 1

Figure 1:
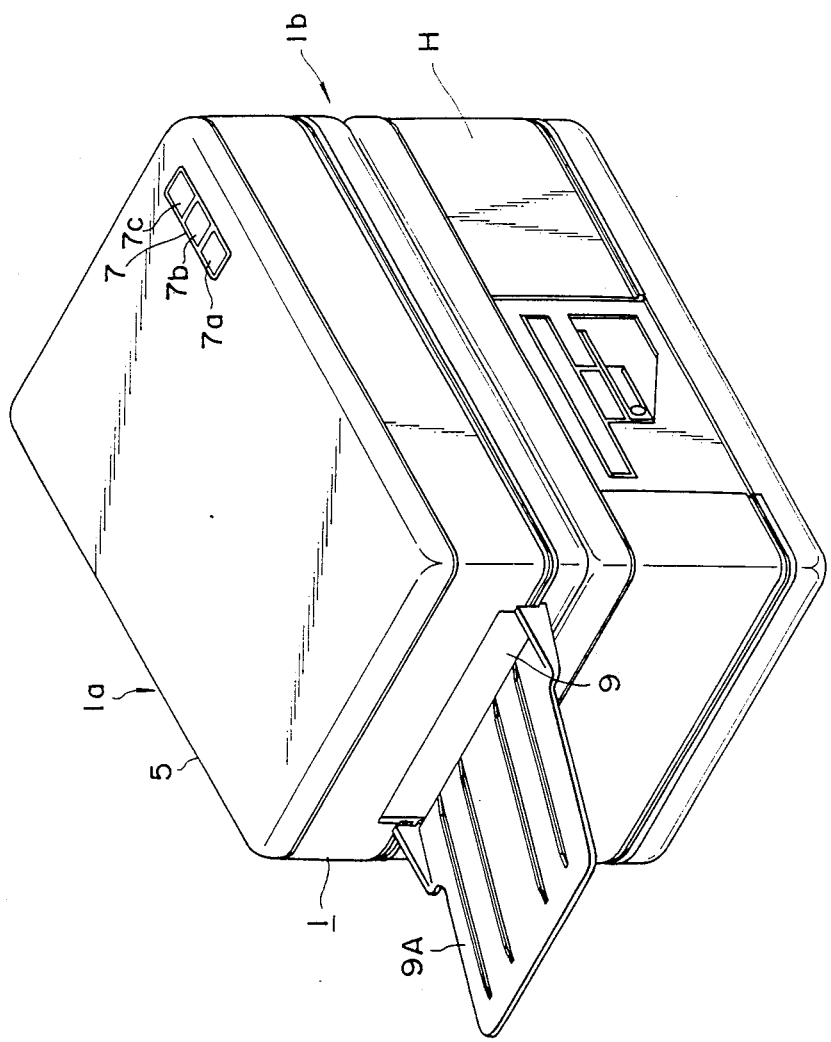
FIG. 1 is a perspective view showing an embodiment (Embodiment 1) of a recording apparatus to which the present invention is applicable.
Figure 2:
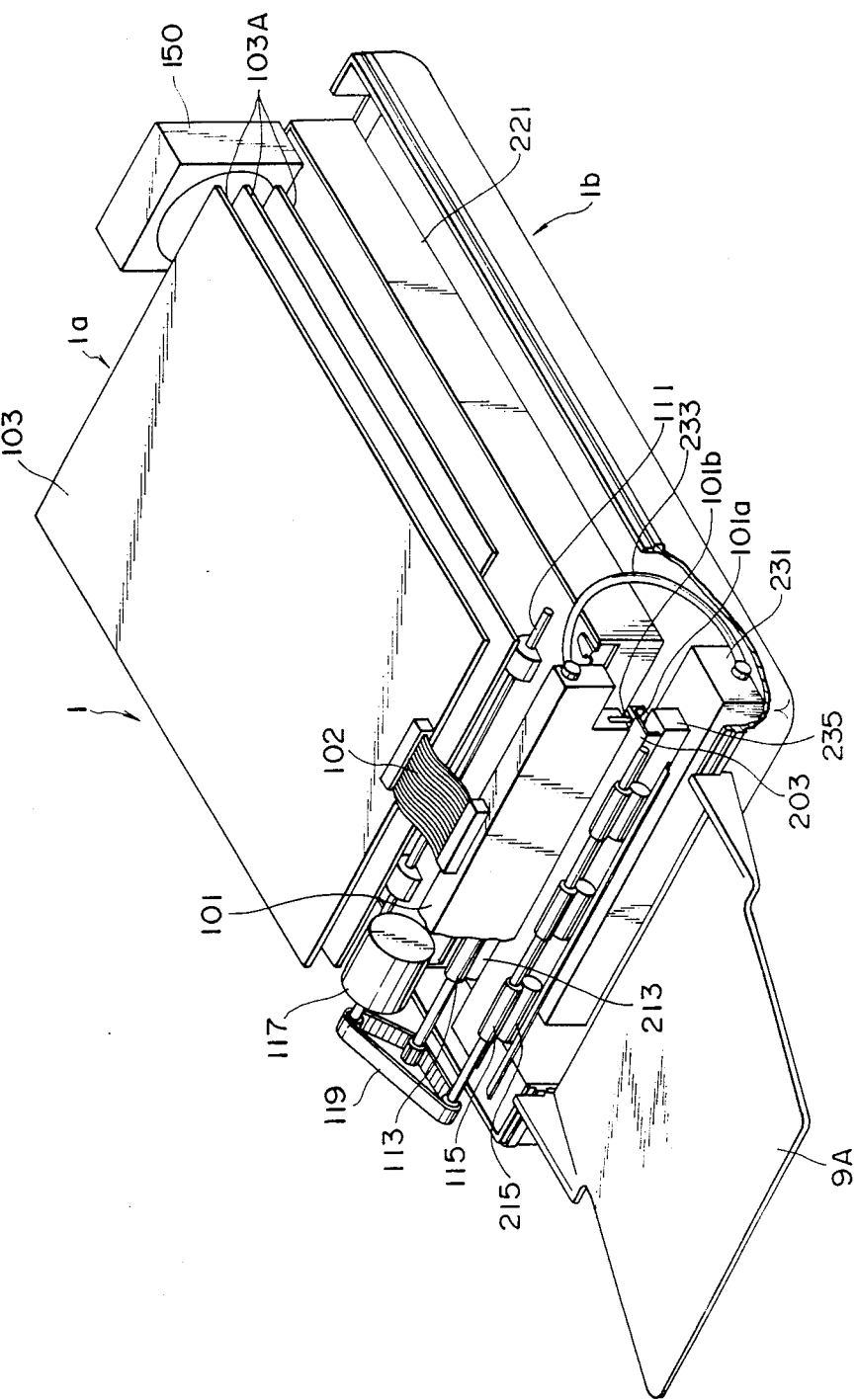
FIG. 2 is a perspective view showing the apparatus according to Embodiment 1 of the present invention with the cover portion thereof removed.

FIG. 1 is a perspective view showing an example of the outer construction of an ink jet recording apparatus which is a preferred embodiment of the present invention, and FIG. 2 is a perspective view showing the ink jet recording apparatus with its outer cover removed for convenience.

In FIGS. 1 and 2, the reference numeral 1 designates a body unit portion having an upper unit 1a as a first unit and a lower unit 1b as a second unit. The upper unit 1a is pivotable up and down relative to the lower unit 1b about a hinge 11, as shown, for example, in FIG. 4. Of course, the upper unit 1a need not always be made pivotable about the hinge 11. The upper unit 1a is provided with a recording head 101, an electric circuit portion 103, a fan 150, an upper discharge roller 115, an upper conveyor roller 113, a paper guide 201 and a paper supply roller 111 which will be described in detail. On the other hand, the lower unit 1b is provided with a platen 203, an ink absorbing member 235, an ink tank 231, a paper cassette 221, a paper discharge tray 9A and idlers 213, 215. The reference numeral 5 denotes a cover disposed over the upper side of the body unit portion 1. The cover 5 is provided with an operating portion 7 in which there are disposed various command switches 7a and 7b such as on-line switches with a host apparatus H and a display device 7c for effecting the mode display. The reference numeral 9 designates a discharge port formed in one side of the apparatus. Recording mediums S on which recording has been effected are piled on the discharge tray 9A through the discharge port 9.

Figure 3:
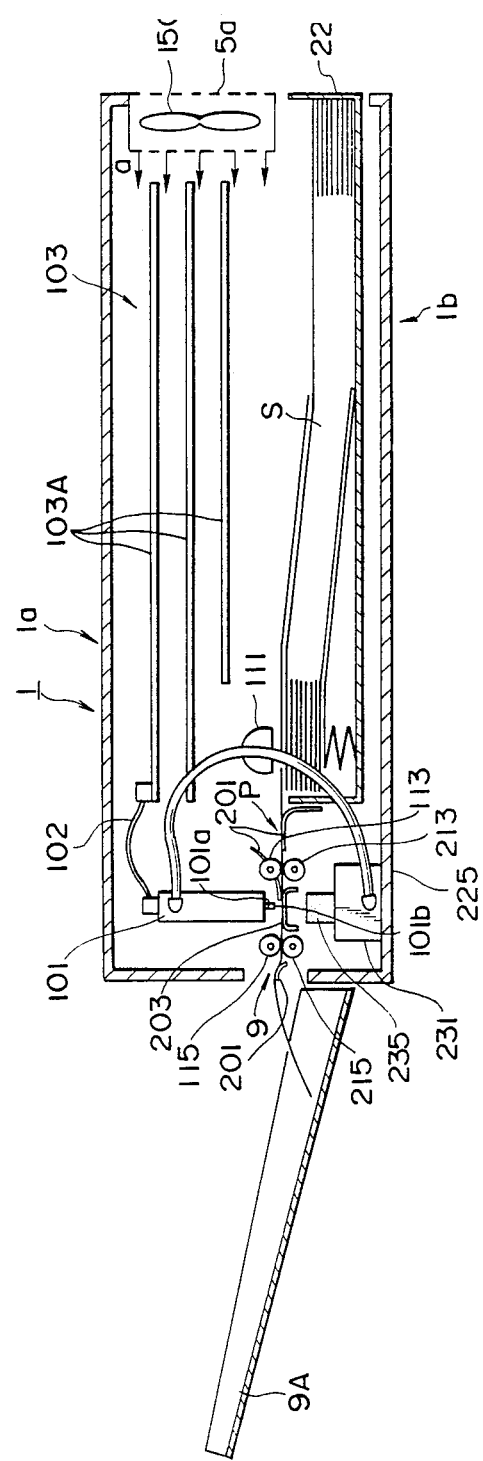
FIG. 3 is a side sectional view of the apparatus according to Embodiment 1.

FIG. 2 is a perspective view showing the apparatus of FIG. 1 with the cover 5 removed to illustrate the interior construction of the apparatus of FIG. 1, and FIG. 3 is a side cross-sectional view of the apparatus of FIG. 1. In these figures, the reference numeral 101 designates an ink jet recording head disposed near the discharge port 9. The ink jet recording head 101 is in the form of the so-called full multi-type wherein nozzles 101a are arranged, for example, at a density of 16 nozzles per 1 mm, over a range corresponding to the full recording width (e.g., recording paper of format A4) of the present apparatus. Also, use may be made of any methods in which electro-mechanical converting elements (not shown) or electro-thermal converting elements (not shown) are disposed at appropriate locations in the ink flow paths such as the nozzles and discharge energy is caused to act on ink in response to the supply of a driving signal from the host apparatus H corresponding to an image to be recorded, whereby ink is discharged from the discharge ports 101b, but the latter type which uses heat energy is excellent in that it is the high-accuracy full multi-type. In the present embodiment, the recording head 101 is provided in such a manner that the discharge port 101b of each nozzle 101a opens vertically downwardly.

The reference numeral 103 denotes the main electric circuit portion of the present apparatus in which a driver circuit for driving the recording head 101 through a flexible cable 102, a power source circuit, a control circuit, various internal circuits of the apparatus and an interface circuit with the host apparatus H outside the apparatus are provided on a base plate 103A. In the present embodiment, the main electric circuit portion 103 is provided in the upper unit 1a in common with the recording head 101 and therefore, even if the ink discharge during recording or unexpected leakage of ink has occurred, the ink has not exerted any influence upon the electric circuit portion 103. That is, even if the ink leaks out of the discharge ports 101b, the flow path thereof is formed on the lower unit 1b side and thus, in the present embodiment, the electric circuit portion 103 is disposed above the flow path, and the ink has exerted no influence upon the main electric circuit portion 103 of the present apparatus. Further, in the present embodiment, the electric circuit portion 103 is disposed at a level higher than the positions at which the discharge ports 101b of the recording head 101 are disposed. Thus, the ink has exerted no further influence upon the electric circuit portion 103. The above-described arrangement of the electric circuit portion 103 and the discharge ports 101b has been effective, but has not always been necessary.

The reference numeral 111 designates a paper supply roller formed by cutting away a part of an arc. The paper supply roller 111 is a roller for supplying recording mediums S such as paper, films or cloths from a cassette 221 containing the recording mediums S therein to the recording station in which recording is effected by the recording head 101.

The reference numerals 113 and 115 respectively denote a conveyor roller disposed at the upstream side on a recording medium conveyance path P with respect to the recording station and a discharge roller disposed near the discharge port 9 at the downstream side. These rollers 113 and 115 are rotatively driven by a motor 117 through a timing belt 119. Thus, in response to this rotative drive, the conveyor roller 113 and the discharge roller 115 have cooperated with idlers 213 and 215 disposed in opposed relationship therewith to effect the conveyance of the recording medium S to the recording station with the recording medium S held therebetween and the discharge of the recording medium S from the recording station to the discharge tray 9A.

The reference numeral 201 designates a paper guide provided on the conveyance path P of the recording mediums S to restrict the conveyance path P, and the reference numeral 203 denotes a platen provided on the lower unit 1b side in opposed relationship with the discharge ports 101b of the recording head 101 to maintain the recording medium S in the recording station, that is, control the recording surface, when recording is effected on the recording medium S by the recording head 101.

The recording mediums S piled in the aforementioned paper cassette 221 have been separated one by one by the paper supply roller 111 through the cooperation thereof with separating means (not shown) and conveyed toward the recording station. The reference numeral 225 designates the bottom plate of the apparatus. In the present embodiment, this bottom plate 225 has served also as a partition wall for blocking the outflow of leaking ink to the outside of the apparatus when unexpected leakage of ink from the recording head 101, etc. has occurred.

The reference numeral 231 designates an ink tank as an ink supply source to the recording head 101. The ink tank 231 is disposed below the platen 203 and designed to supply ink to the recording head 101 through a flexible supply tube 233. The reference numeral 235 denotes an ink absorbing member formed of a water-absorbent porous material. In the present embodiment, the ink absorbing member 235 is disposed on top of the ink tank 231 below the platen 203. This ink absorbing member 235 might appropriately replace the platen 203 in position and be constructed so as to be capable of opposing or bearing against the discharge ports 101b of the recording head 101 and to be used for the discharge restoring operation or the capping operation of the recording head 101. Thereby, the ink dripping from the recording head 101 has been appropriately collected.

The reference numeral 150 designates a fan for introducing air from the outside of apparatus to thereby cool the various portions of the apparatus. In the present embodiment, this fan 150 has been disposed on that side of the apparatus which is opposite to the discharge port 9, whereby the air stream (indicated by arrows a in FIG. 3) from an air intake port 5a in said side to the discharge port 9 has been produced. As described above, in the present embodiment, the recording head 101 has been provided near the discharge port 9. Therefore, the satellite which may secondarily occur during the discharge of ink droplets from the recording head 101, the ink mist which may adhere on the surface of the recording medium S by the scattering of ink, dust, the paper powder of the recording medium, etc. have been immediately carried out of the apparatus through the discharge port 9 by riding on the air stream or by adhering to the recording medium S or by both. Thereby, they are prevented from adhering to various parts in the apparatus to contaminate them or break down the electric circuit portion 103. That is, in the present embodiment, the cooling fan 150 for cooling the electric circuit has been shown with respect to a case where it is used also as blower means in the apparatus which eliminates the ink mist.

When the ink mist has been caused to adhere to the recording medium S, it has exerted very little influence upon the quality of printing, etc., because in general, ink mist is very fine. Also, when the ink mist is to be carried by the air stream, a filter or the like might be provided near the discharge port 9 so that the ink mist might be collected by it. If the ink mist has been thus collected by the recording medium S or the filter, the exterior walls or the like of the apparatus have not been contaminated.

In addition to the above-described construction, in the present embodiment, the body unit portion 1 has been made separable into the upper unit 1a and the lower unit 1b in the manner described below so as to facilitate the repairs of various parts, the jam treatment, etc.

In FIG. 4, there is shown an example of the construction of a mechanism for separating the upper unit 1a and the lower unit 1b from each other and opening the interior of the apparatus to thereby secure the space available for the above-mentioned repairs and treatement. In FIG. 4, the reference numeral 11 designates a hinge disposed on the side opposite to the discharge port 9 to permit pivotal movement of the upper unit 1a relative to the lower unit 1b, and the reference numeral 13 denotes a spring for holding the upper unit 1a in its opened position.

In the present embodiment, as described above, the recording head 101, the rollers 113 and 115, etc. are disposed near the discharge port 9 in the upper unit 1a, and the platen 203, the idlers 213, 215, the paper cassette 221, the ink tank 231 and the ink absorbing member 235 are disposed near the discharge port 9 in the lower unit 1b. Therefore, in the opened position of the body unit portion 1 as shown in FIG. 4, the ink system including the recording head 101, the ink tank 231 and the ink absorbing member 235 and the paper supplying or conveying system including the paper cassette 221 and the roller members have been widely opened.

That is, in the present embodiment, the upper unit 1a and the lower unit 1b become spaced apart from each other along the path along which the recording medium S is fed out from the cassette 221 to the discharge port 9 and thus, design has been made such that the conveyance path is opened if the upper unit 1a is pivoted upwardly relative to the lower unit 1b.

Accordingly, in this state, the work space necessary for the repairs of various parts, the replacement of the ink absorbing member and the elimination of jam has been secured. Thus, that work has become easy. Also, in this state, the replenishment of recording mediums S and the supply of ink might be done. The present embodiment has been shown with respect to an example in which the upper and lower units are spaced apart from each other and opened along the entire conveyance path of the recording medium S, whereas this is not restrictive, but the above-described effect could be attained if at least the portion of the recording station by the recording head is opened.

The construction for thus securing the work space is not limited to that shown in FIG. 4, but could be various. For example, a good result has been obtained in any of a construction in which suitable struts for supporting the upper unit 1a are provided at four corners of the lower unit 1b and the upper unit 1a is made vertically movable along the struts, a construction in which the upper unit 1a is obliquely upwardly slidable in its horizontal state by the use of a parallel link mechanism, and a construction in which the upper unit 1a and the lower unit 1b are not opened in the vertical direction but are opened in the horizontal direction. Above all, the hinge type of the present embodiment is simple in construction and reliable in operation and has been very preferable.

Figure 5A:
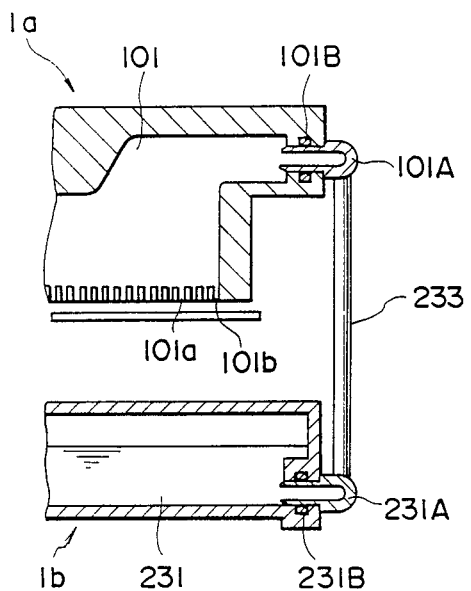

Now, in the present embodiment, in the ink system, the recording head 101 has been disposed on the upper unit 1a side and the ink tank 231 has been disposed on the lower unit 1b side. Also, they have been designed to communicate with each other through a supply tube 233. FIG. 5A is a schematic side sectional view showing the connecting state of the supply tube, and FIG. 5B is a perspective view thereof.

In the present embodiment, as shown in FIG. 5A, pivotable ink joint members 101A and 231A are provided at the connecting portion between the recording head 101 and the ink supply tube 233 and the connecting portion between the ink tank 231 and the ink supply tube 233, respectively, so that the displacement of the body unit portion 1 resulting from the opening or closing thereof may be absorbed by the rotation of the pivotable ink joint members 101A and 231A. In FIG. 5A, the reference characters 101B and 231B designate O-rings for shutting off the ink.

FIG. 5B shows the details of the connected portion of the supply tube, and particularly shows the construction thereof on the ink tank 231 side. In FIG. 5B, the reference character 231D designates an elbow provided integrally with the supply tube 233 at one end thereof, the reference character 231C denotes a keep ring for the O-ring 231B, and the reference character 231E designates a keep plate for controlling the elbow 231D vertically relative to the ink tank 231 and holding the elbow 231D so as not to slip off from the ink tank 231. The elbow 213D has been made rotatively slidable relative to the ink tank 231, the O-ring 231B, the keep ring 231C and the keep plate 231E.

Also, in the present embodiment, such a construction has likewise been adopted on the recording head 101 side.

With such a construction, the supply tube 233 has been made into a flexible tubular member formed of a material such as polyethylene, whereby the upper unit 1a and the lower unit 1b could be smoothly opened without a great influence being exercised upon the ink flow path. Further, in the present embodiment, the elbow 231D is pivotable relative to the ink tank 231 and the recording head 101 and therefore, when the upper unit 1a and the lower unit 1b have been opened, the angle of mounting of the supply tube 233 has been naturally displaced by the resiliency of the supply tube itself.

By this, the slack of the supply tube 233 when the upper unit 1a and the lower unit 1b remain closed could be reduced and the amount of deformation of the supply tube could be reduced. Also, by this, the supply tube 233 could be made to have a length sufficient to connect the ink tank 231 and the recording head 101 substantially linearly when the units 1a and 1b were opened at a maximum angle of opening (see FIG. 4) and therefore, the flexibility required of the supply tube 233 could be designed to a small value. These facts have made it realizable to make the supply tube thick and short. This has also greatly contributed to the reduction in the flow path resistance of the ink supply path from the ink tank to the recording head, the prevention of entry of air into the line, and the compactness of the apparatus resulting from the possibility of reducing the flexure space for the supply tube 233.

The effect resulting from rotatably mounting the supply tube as described above can be sufficiently expected and therefore, a benefit could be obtained even if the connecting portion shown in FIGS. 5A and 5B was provided on only one of the ink tank 231 side and the recording head 101 side.

The construction permitting the opening of the units 1a and 1b is not limited to the above-described construction comprising a combination of the flexible supply tube and the pivotable joints, but use could be made, for example, of a construction in which a relatively rigid supply tube was connected through bellows or the like.

Now, in the ink jet recording, the distance of blight of an ink droplet, i.e., the distance between the opening portion of the nozzle of the recording head 101 and the paper, is one of the factors which greatly influence the quality of recording. Particularly, in the case of a structure in which as in the present embodiment, the upper unit 1a having the recording head 101 and the lower head 1b having the platen 203 which controls the paper can be spaced apart from each other, it is desirable to give consideration so that in the joined state of the units, the recording head and the platen are accurately opposed to each other in parallel relationship with each other.

To realize this, it has been conceived, for example, to hold the recording head 101 so as to be vertically movable relative to the frame of the upper unit 1a, and cause a dashing member fixed to the platen 203 of the lower unit 1b to strike against a portion of the recording head in the joined state of the upper and lower units.

So, in the present embodiment, to realize this compactly and simply, design has been made such that the recording head 101 is fixed to the upper unit 1a and the platen 203 is fixed to the lower unit 1b and in the joined state of the upper and lower units 1a and 1b, dashing members (not shown) provided in the upper and lower units are caused to strike against two points near the opposite ends of the recording head 101. It has also been preferable to provide suitable lock means to secure said joined state.

According to this, it has become possible to simply keep a highly accurate and well-reproducible distance between the recording head and the paper during the opening-closing of the upper and lower units 1a and 1b by accurately controlling the mounting dimensions of the recording head 101 or the platen 203 relative to the dashing members of the upper and lower units 1a and 1b.

In the ink jet recording apparatus according to the present embodiment as described above, the on-demand type recording head 101 has been disposed near the discharge port 9 of the apparatus with the discharge ports thereof facing vertically downwardly and the paper cassette 221 has been disposed below the electric circuit portion 103 so that a recording medium conveyance path including the platen 203 is formed below the discharge ports of the recording head. Therefore, the conveyance distance of the recording medium has been shortened and the conveying system has been simplified and accordingly, the construction of the apparatus could be made very compact.

Also, the main electric circuit portion 103 has been provided on the upper unit 1a side in common with the recording head 101 and therefore, even when the ink has been discharged or when leakage of the ink has occurred, the ink has not adversely affected the electric circuit portion 103.

In addition, the internal pressure of the apparatus has been made higher than the atmospheric pressure so that there is formed an air stream flowing out through the discharge port 9, whereby the ink mist produced during the discharge of ink droplets by the head 101 provided near the discharge port 9 and the paper powder or the like produced by the conveyance of the recording medium have been quickly carried out of the apparatus. Thus, the contamination or accident which would otherwise result from the adherence of the ink to the various interior parts in the apparatus has been reliably prevented.

Furthermore, the upper unit 1a has been made pivotable relative to the lower unit 1b by the hinge 11 disposed on the side opposite to the discharge port 9, whereby during the pivotal movement thereof, the ink system and the conveying system have been widely opened and accordingly, the work required for the repairs of various parts and the jam treatment has become easy.

Also, the compactness of various parts including the conveying system has been achieved by providing the recording head near the discharge port, but the location at which the recording head is disposed is not always limited to the neighborhood of the discharge port. In such a case, an outflow port for air has been provided separately near the recording head so that the ink mist, etc. may be rapidly discharged, whereby the problems of the ink mist, etc. could be solved.

Further, in the above-described embodiment, as shown in FIGS. 2 and 3, each base plate 103A is horizontally disposed. Therefore, the air stream from the fan 150 suffers very little from the loss by resistance and is effectively directed to the vicinity of the recording head 101 and the ink mist, paper powder, etc. are rapidly discharged from the discharge port 9, but the effect of the air stream could be made more reliable by adopting a suitable arrangement. For example, it has also been effective to incline each base plate 103A so as to become lower toward the left as viewed in FIGS. 2 and 3 so that the air stream from the fan 150 directly impinges on the discharge ports of the recording head 101.

Also, it has been possible to provide a duct 180 having an opening 180A opposed to the fan 150 and an opening 180B opposed to the recording head 101, as shown in FIG. 6, so that the air stream is directed to the recording head 101 through the duct 180.

Further, instead of the cooling fan 150 being used also as a blower as described above, blower means forming a flow of air might be disposed separately at a suitable location. Also, an effect has been found in driving this blower means only during printing, and by doing so, it has been possible to minimize the desiccation of the nozzles 101a, etc. of the recording head 101.

In any case, the blower means used to eliminate the ink mist could be any one which would increase the internal pressure of the apparatus slightly above the atmospheric pressure, and has been sufficiently effective even if the air stream formed thereby is minute.

Also, the present embodiment has been described with respect to a case where the host apparatus H is employed as the recording data supply source, but of course, such a data supply source may be any one. For example, instead of or in addition to the host apparatus H, reading means for reading the image of an original may be provided on top of the upper unit 1a and the read image information may be converted into an electrical signal which in turn may be supplied to the recording head 101. A preferred embodiment provided with such image reading means will be described later as a second embodiment.

Figure 7:
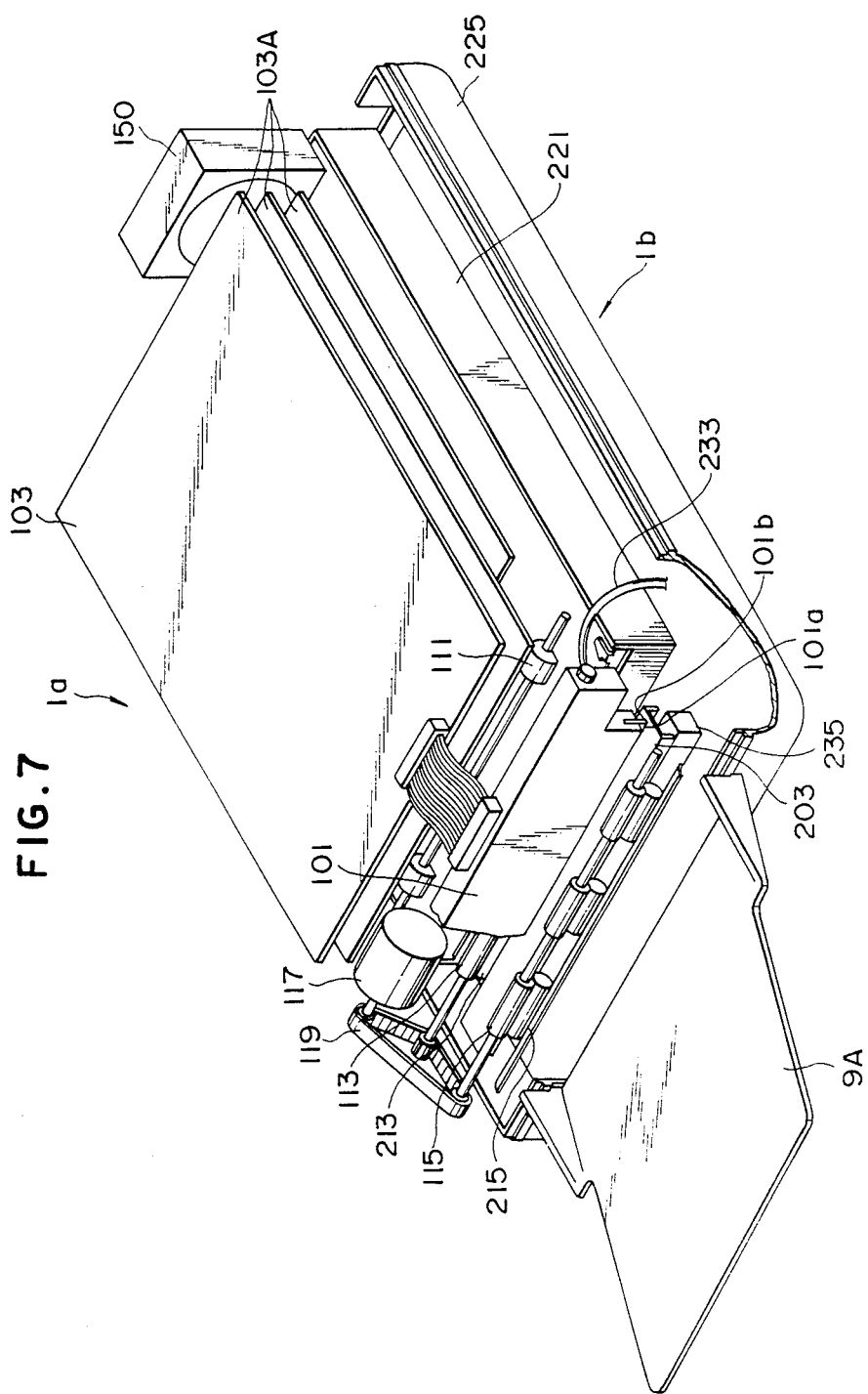
FIG. 7 is a perspective view showing the apparatus according to the embodiment of FIG. 6 of the present invention with the cover portion thereof removed.

The construction around the platen of the recording apparatus of the present invention will now be described with reference to FIG. 7. The reference numeral 203 designates the platen provided on the lower unit 1b side in opposed relationship with the recording head 101 to control the recording surface. The platen 203 has been made movable from its position opposed to the recording head 101, by a driving portion to be described which is not shown in FIG. 7.

The recording mediums piled on the aforementioned paper cassette 221 are separated one by one by the paper supply roller 111 through the cooperation thereof with separating means (not shown) and are conveyed toward the recording station. Designated by 225 is the bottom plate of the apparatus. In the present embodiment, the bottom plate 225 has been used also as a partition wall for blocking the outflow of leaking ink to the outside of the apparatus when unexpected leakage of ink from the recording head 101, etc. has occurred.

The reference numeral 233 designates a flexible supply tube for communicating the recording head with an ink tank, not shown, as an ink supply source. The reference numeral 235 denotes an ink absorbing member formed of a water-absorbent porous material. In the present embodiment, the ink absorbing member 235 has been disposed below the platen 203. The ink absorbing member 235 could be designed so as to be capable of appropriately replacing the platen 203 in position and being opposed or joined to the discharge ports of the recording head 101 so that the ink absorbing member could be used for the restoration of the discharge of the recording head 101 and for the capping of the recording head.

Thereby the ink has been appropriately collected from the recording head 101 side.

The reference numeral 150 designates a fan for introducing air from outside of the apparatus and thereby cooling various parts of the apparatus. In the present embodiment, this fan 150 has been disposed on that side of the apparatus which is opposite to the discharge port 9 for the recording medium, whereby the air stream from an air intake port 5a in said side to the discharge port 9 has been produced. As described above, in the present embodiment, the recording head 101 has been provided near the discharge port 9 and therefore, the satellite which may secondarily occur during the discharge of ink droplets from the recording head 101, the ink mist which may be caused on the surface of the recording medium by the scattering of ink, dust, the paper powder of the recording medium, etc. have been immediately carried out of the apparatus through the discharge port by riding on the air stream. Thereby, they are prevented from adhering to various parts in the apparatus to contaminate them or break down the electric circuit portion 103. In the present embodiment, the cooling fan 150 for cooling the electric circuit portion 103, etc. has been used also as blower means in the apparatus which eliminates the ink mist.

Figure 8:
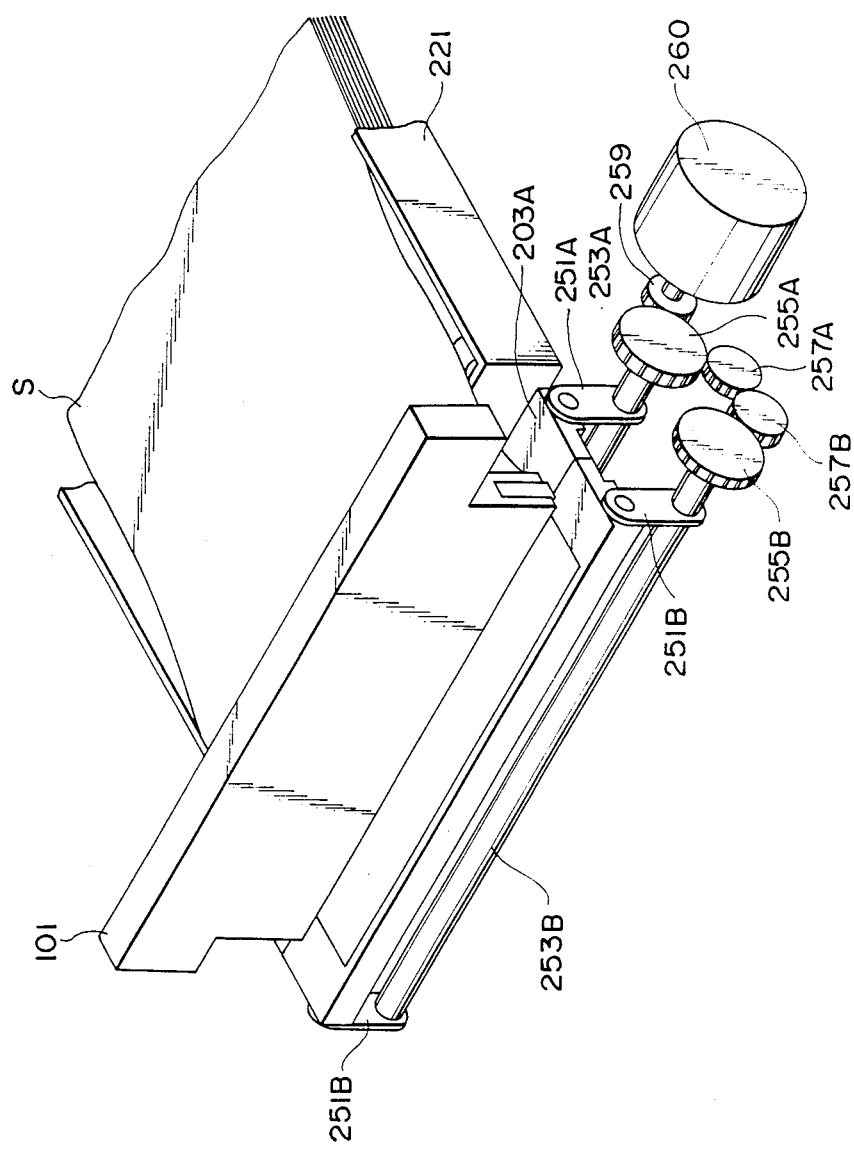
FIG. 8 is a perspective view showing an example of the construction of the essential portions of another embodiment of the present invention.

FIG. 8 shows an example of the construction of a driving portion for the platen according to the present invention. The reference characters 203A and 203B designate platen members forming the platen 203 in the joined state shown. The platen members 203A and 203B are connected through arms 251A and 251B to shafts 253A and 253B extending lengthwise of the recording head 101, and are pivotable about these shafts 253A and 253B in a direction to open the recording surface. Gears 255A and 255B are provided on the ends of the shafts 253A and 253B, respectively, and through these gears 255A and 255B, the platen members are connected to a set of gears 257A and 257B meshing with each other, so that the directions of pivotal movement of the platen members 203A and 203B for opening/forming the recording surface may be opposite to each other. The transmission mechanism including these gears is combined with a motor 260 through a gear 259, and by controlling the direction of revolution of the motor 260, predetermined pivotal movement of the platen members 203A and 203B has been made possible.

Figure 9A:
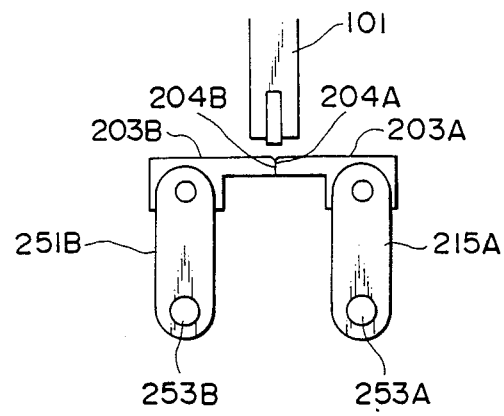
FIGS. 9A and 9B are side views for illustrating the operation of the embodiment shown in FIG. 8.
Figure 9B:
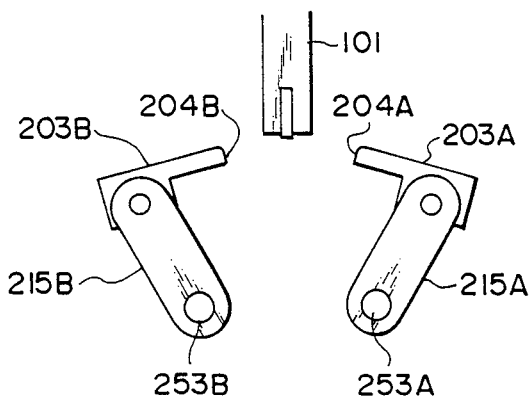

That is, as shown in FIG. 9A, during recording, the dashing surface 204A of the platen member 203A and the dashing surface 204B of the platen member 203B are held in their joined state, whereby the platen members 203A and 203B are designed to form the platen 203 for controlling the recording surface of the recording medium by the recording head 101. In contrast, during maintenance, as shown in FIG. 9B, the platen members 203A and 203B are opened to the left and right as viewed in the figure by driving the motor 260, through the transmission mechanism, whereby a space is secured below the recording head 101 and, for example, by joining the ink absorbing member to the discharge ports of the recording head 101, it has become possible to effect cleaning or effect the discharge restoring operation such as preliminary discharge with the ink absorbing member being proximately opposed to the discharge ports of the recording head. Such joining or proximate disposition of the ink absorbing member may be accomplished as by inserting the absorbing member from a suitable location on the apparatus, or could be accomplished by bringing the ink absorbing member into proximity to the discharge ports of the recording head by a suitable mechanism through the space secured with movement of the platen members 203A and 203B.

In the present embodiment, the platen 203 has been constructed of the two members 203A and 203B so that during recording, the dashing surfaces 204A and 204B are joined together. Therefore, when a recording medium has been conveyed, there occurs a case where the forward movement of the leading edge of the recording medium is hampered in this dashing portion to cause a jam.

Figure 10A:
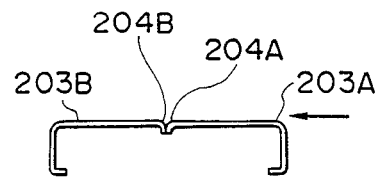
FIGS. 10A and 10B are side views showing two examples of the construction of a platen which can be adopted in the embodiment shown in FIG. 8.
Figure 10B:
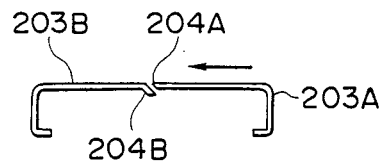

FIGS. 10A and 10B show two examples of the construction of the platen members 203A and 203B for smoothing the movement of the recording medium and preventing a jam as a countermeasure for such a jam. First, FIG. 10A shows an example in which both dashing surfaces 204A and 204B are provided with curved surfaces, and by these curved surfaces, the leading edge of the recording medium has been smoothly guided in the direction of movement indicated by the arrow in FIG. 10A. FIG. 10B shows an example in which the dashing surface 204B of the platen member 203B lying at the downstream side in the direction of movement of the recording medium is provided with an inclined surface downwardly inclined with respect to the direction of movement of the recording medium, and occurrence of a jam could also be prevented in the dashing portion by such a construction.

In the above-described construction, the transmission mechanism comprising the motor 260 and the gear train has been provided to make the two platen members 203A and 203B pivotable, but alternatively, for example, a solenoid might be used during the driving and an appropriate link mechanism might be disposed so that the pivotal movement of the platen members 203A and 203B might be accomplished.

Figure 11:
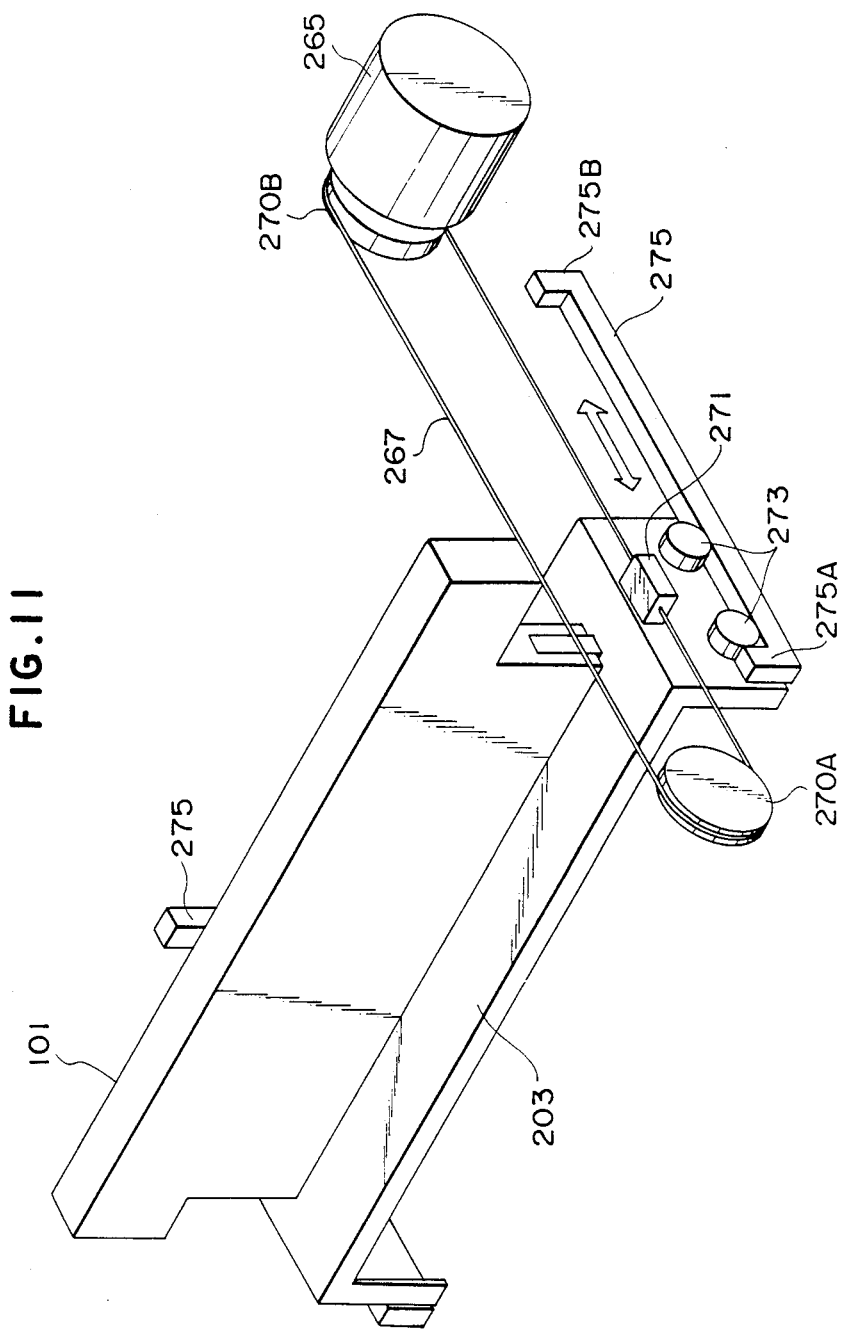
FIG. 11 is a perspective view showing another example of the construction of the essential portions of the present invention.

FIG. 11 shows a further example of the construction of the platen driving portion. In this example, the platen 203 is a unitary member which is movable in the horizontal plane in a direction orthogonal to the lengthwise direction of the recording head 101, i.e., the direction of conveyance of the recording medium.

In FIG. 11, the reference characters 270A and 270B designate pulleys over and between which is extended a wire 267 for moving the platen 203 in the direction of the arrow. The reference numeral 265 denotes a motor coupled to one pulley 270B to move the platen 203 through the wire 267. The reference numeral 271 designates a wire fixing bed which is provided on the platen 203 to fix the platen to the wire 267. The reference numeral 273 denotes wheels provided on the platen 203 to move the platen 203 smoothly along a guide rail 275 extending in the direction of the arrow. The reference characters 275A and 275B designate stoppers provided on the guide rail 275 and engageable by the wheels 273 to position the platen 203 at a position opposed to the recording head 101 and a position spaced apart from the recording head 101.

By such a construction as well, during recording, the platen 203 is positioned at the shown position to control the recording surface of the recording medium, while during maintenance, the motor 265 is driven to position the platen 203 at the position of the stopper 275B, whereby a large work space could be secured below the recording head 101 to improve the working property.

Another mode of the construction around the platen of the recording apparatus of the present invention will now be described with reference to the drawings.

Figure 12:
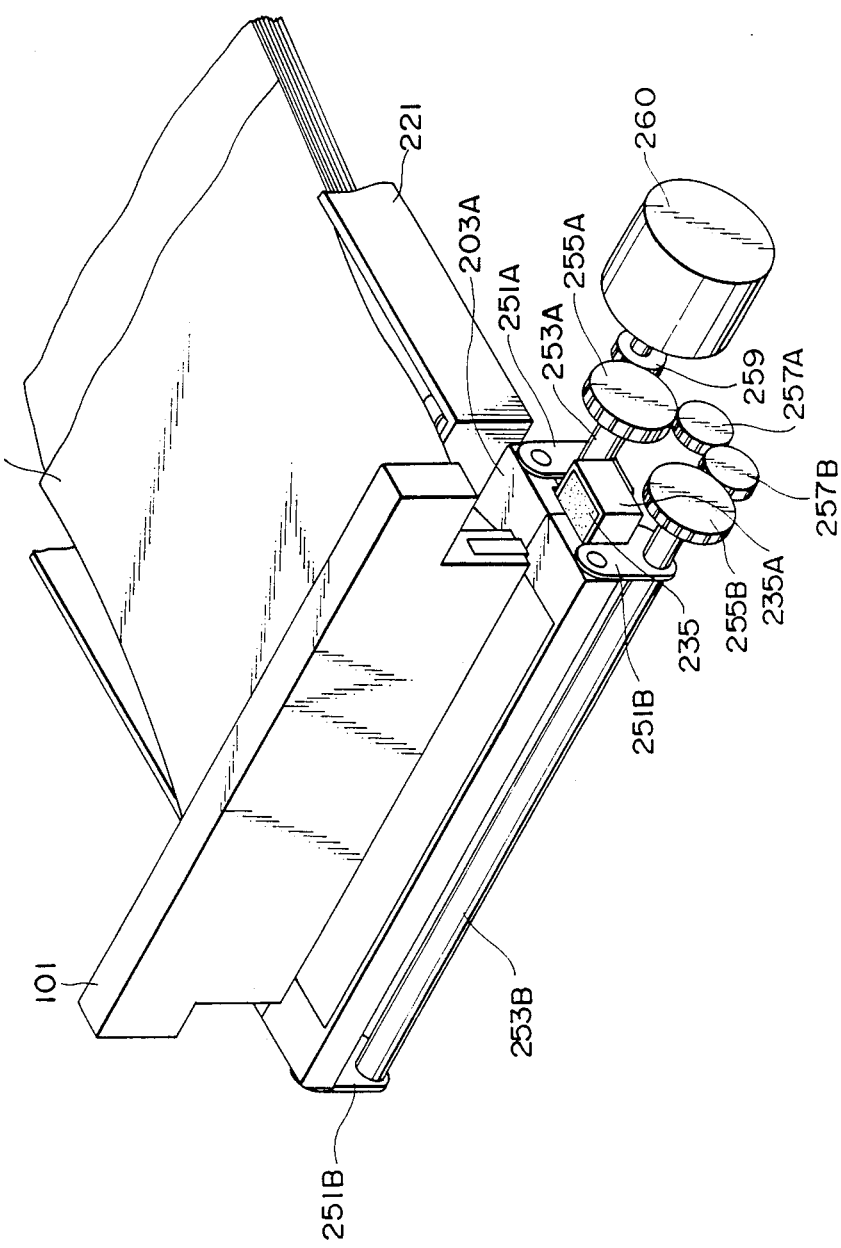
FIG. 12 is a perspective view showing still another example of the construction of the essential portions of the present invention.

FIG. 12 shows an example of the construction of the platen driving portion according to the present invention. The reference characters 203A and 203B designate platen members forming the platen 203 in their joined state shown. The platen members 203A and 203B are connected through arms 251A and 251B to shafts 253A and 253B, respectively, extending lengthwise of the recording head 101 and are pivotable about these shafts 253A and 253B in a direction to open the recording surface. Gears 255A and 255B are provided on the ends of the shafts 253A and 253B, respectively, and through these gears 255A and 255B, the platen members are connected to a set of gears 257A and 257B meshing with each other so that the directions of pivotal movement of the platen members 203A and 203B for opening/forming the recording surface are opposite to each other. The transmission mechanism including these gears is combined with a motor 260 through a gear 259, and by controlling the direction of revolution of this motor 260, predetermined pivotal movement of the platen members 203A and 203B has been made possible.

Also, the lower portions of the arms 251A and 251B have been made to extend inwardly from their mounted portions with respect to the shafts 253A and 253B and those inwardly extending portions have been engaged with the bottom surface of a case 235A in which an ink absorbing member 235 is contained.

The operation of the driving portion for the platen 203 and the ink absorbing member 235 will now be described with reference to FIGS. 13A–13C.

Figure 13A:
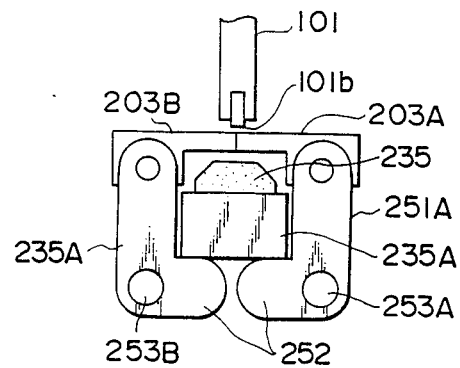
FIGS. 13A–13C are side views for illustrating the operation of the embodiment shown in FIG. 12.

First, as shown in FIG. 13A, during recording, the dashing surface 204A of the platen member 203A and the dashing surface 204B of the platen member 203B are held in their joined state, whereby the platen members 203A and 203B have been designed to form the platen 203 for controlling the recording surface of the recording medium by the recording head 101. Also, design has been made such that at this time, the inwardly extending portions 252 of the respective arms are engaged with the bottom surface of the case 235A in their substantially horizontally kept state and therefore, the ink absorbing member 235 has been positioned below the platen members 203A and 203B.

In contrast, when the elimination of the desiccation or clogging of the ink in the nozzles including the discharge ports, the elimination of bubbles mixed with the ink or the discharge for replacing the viscosity-increased ink with fresh ink (the preliminary discharge) has been effected, the motor 260 has been driven. Thereupon, as shown in FIG. 13B, the platen members 203A and 203B have been opened to the left and right as viewed in the figure through the transmission mechanism and at the same time, the arm portions 252 have been pivoted upwardly about the shafts 253A and 253B. The ink absorbing member 235, together with the case 235A, has been pushed up and disposed so as to be directly opposed to the underside of the recording head 101. Thus, the discharge restoring operation by the preliminary discharge has become possible. Such a discharge restoring operation by the preliminary discharge could be accomplished by driving the motor 260 at a suitable chance before or during the recording operation and thereby driving the recording head with the absorbing member opposed thereto.

Figure 13B:
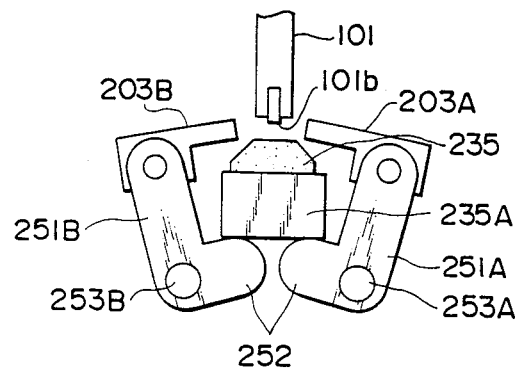
Figure 13C:
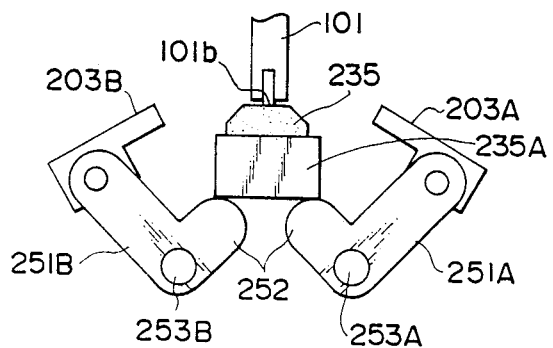

Further, the cleaning of the end surface including the discharge ports could be accomplished by pivotally moving the arms 251A and 251B from their state of FIG. 13B and joining the ink absorbing member 235 to the discharge ports of the recording head 101, as shown in FIG. 13C. Thus, the ink, etc. adhering to the end surface of the discharge ports has been immediately absorbed by the ink absorbing member 235 and the restoration of discharge by cleaning has been accomplished. If an elastic member formed of silicone rubber or like material is disposed instead of the ink absorbing member 235, the function of capping which protects the vicinity of the discharge ports from desiccation or entry and adherence of dust or the like during the non-use of the apparatus would be performed.

Again in the present embodiment, the platen 203 has been constructed of the two members 203A and 203B and design has been made such that the dashing surfaces 204A and 204B are joined together during recording. Therefore, there have been cases where the movement of the leading edge of the recording medium is hampered in the dashing portion to cause a jam when the recording medium is conveyed.

However, as described in connection with the previous example, the occurrence of a jam could be prevented by adopting the shape of the platen as shown in FIGS. 10A and 10B.

In the above-described embodiment, the transmission mechanism comprising the motor 260 and the gear train has been provided to enable the two arms 251A and 251B to be pivotally moved, but the same purpose could also be achieved, for example, by using a solenoid during the driving and disposing an appropriate link mechanism to thereby pivotally move the platen members 203A and 203B.

Figure 14:
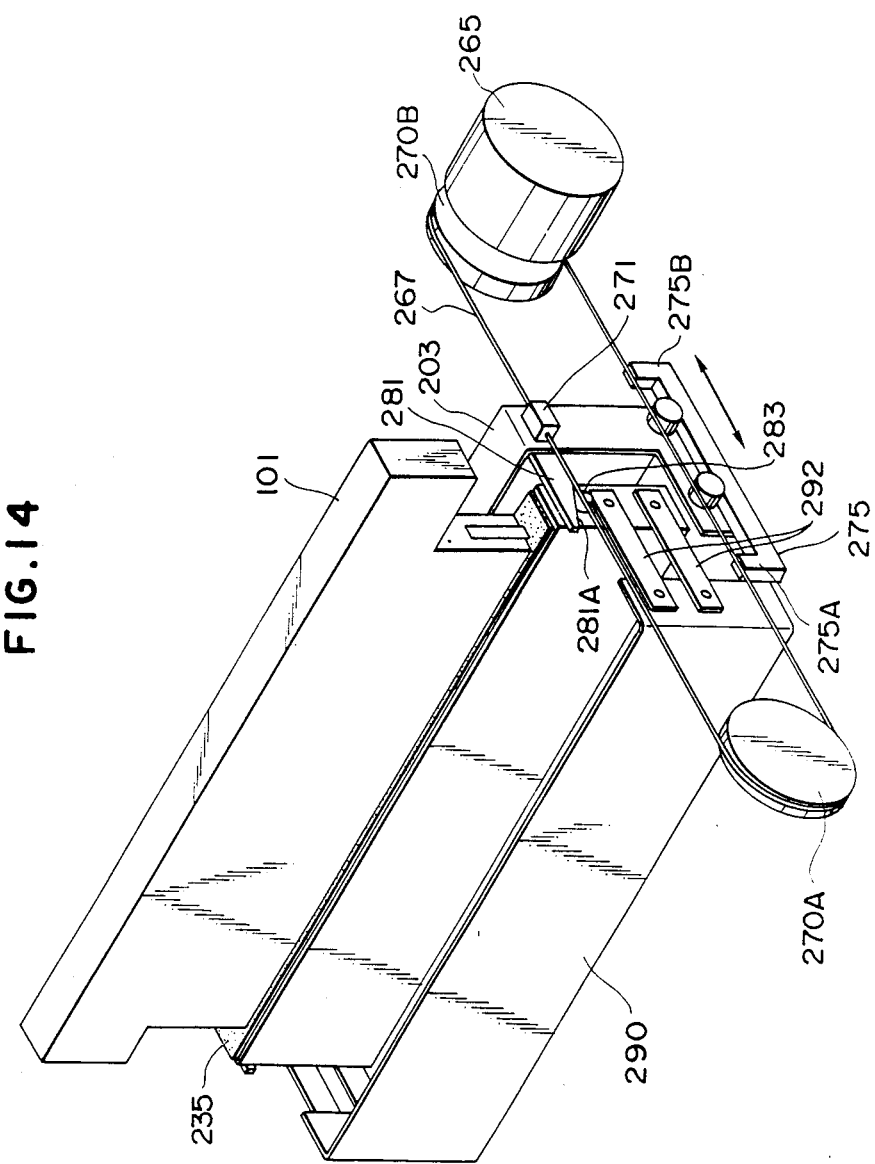
FIG. 14 is a perspective view showing yet still another example of the construction of the essential portions of the present invention.

FIG. 14 shows still a further example of the construction of the platen driving portion. In this example, the platen 203 comprises a unitary member and is made moveble in a horizontal plane in a direction orthogonal to the lengthwise direction of the recording head 101, i.e., the direction of conveyance of the recording medium, and the ink absorbing member 235 is vertically movable with the movement of the platen.

In FIG. 14, the reference characters 270A and 270B designate pulleys over and between which is extended a wire 267 for moving the platen 203 in the direction of the arrow. The reference numeral 265 denotes a motor coupled to one pulley 270B to move the platen 203 through the wire 267. The reference numeral 271 designates a wire fixing bed which is provided on the platen 203 to fix the platen to the wire 267. The reference numeral 273 denotes wheels combined with the platen 203 to move the platen 203 smoothly along a guide rail 275 extending in the direction of the arrow. The reference characters 275A and 275B designate stoppers provided on the guide rail 275 and engageable by the wheels 273 to position the platen 203 at a position opposed to the recording head 101 at a position for joining the ink absorbing member 235 to the recording head 101.

The reference numeral 281 denotes a guide member combined integrally with the platen 203. The guide member 281 is provided with a cam surface 281A engageable with a guide pin 283 projectedly provided on a case 235A containing the ink absorbing member 235 therein to thereby permit vertical movement of the ink absorbing member 235. The case 235A is normally biased upwardly by a bias member such as a spring (see FIGS. 15A and 15B), and the upward movement thereof has been controlled by the guide pin 283.

The reference numeral 290 designates a fixed bed which is fixed to the apparatus, and the reference numeral 292 denotes a parallel link which connects the fixed bed 280 to the case 235A. The falling of the ink absorbing member 235 during the vertical displacement thereof has been prevented thereby.

Figure 15A:
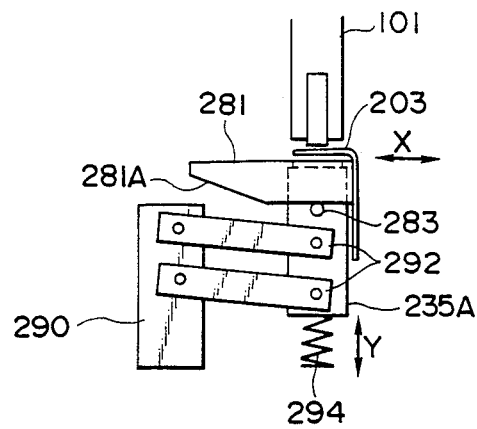
FIGS. 15A and 15B are side views for illustrating the operation of the construction shown in FIG. 14.

In such a construction, design has been made such that during recording, the platen 203 is positioned near the stopper 275A as viewed in FIG. 14 so as to form the recording surface of the recording medium. That is, in this state, as shown in FIG. 15A, the cam surface 281A of the guide 281 has positioned the ink absorbing member 235 in its lowered position against the bias force of a spring 294 through the guide pin 283.

Figure 15B:
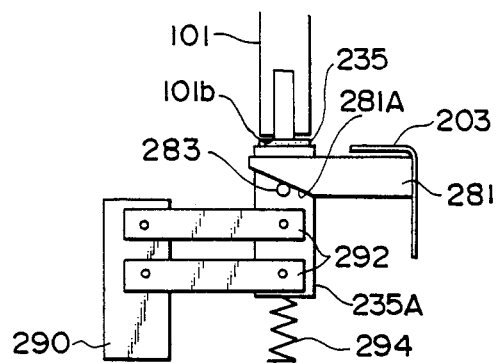

In contrast, when the discharge restoring operation by cleaning or the capping operation is to be effected, the motor 265 has been driven to move the platen 203 and position it near the stopper 275B. Design has been made such that in this state, with the movement of the guide 281 in the direction X, the ink absorbing member 235 is moved up by the action of the spring 294 to be joined to the discharge ports of the recording head 101 while the guide pin 283 is engaged with the cam surface 281A, as shown in FIG. 15B.

If the motor 265 is controlled to appropriately position the platen 203 between the stoppers 275A and 275B, the ink absorbing member 235 becomes opposed to the recording head 101 with a proper distance kept therebetween and therefore, the discharge restoring operation by preliminary discharge could be performed.

Another embodiment of the recording apparatus of the present invention will hereinafter be described with reference to the drawings.

Figure 16:
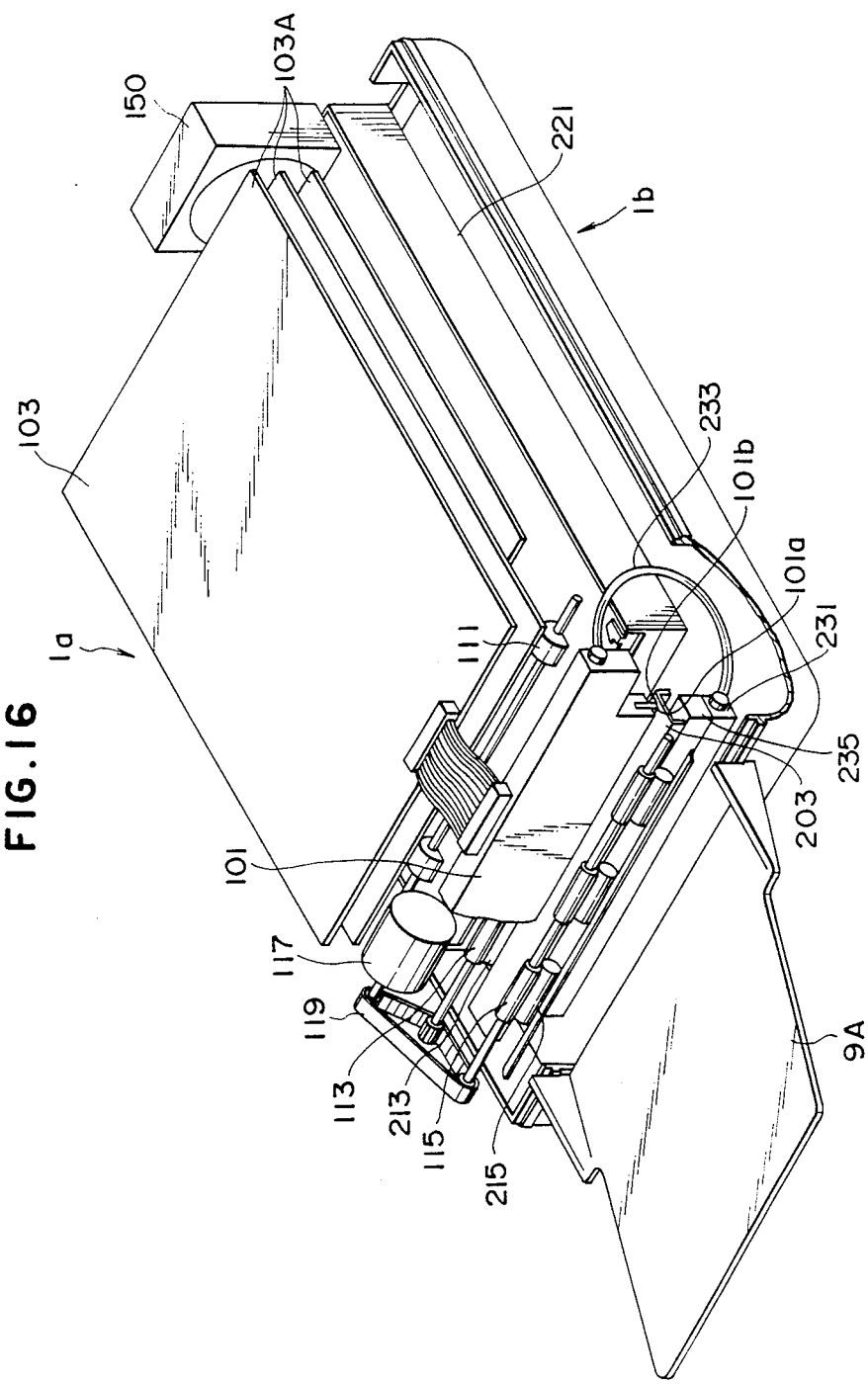
FIG. 16 is a perspective view showing an apparatus according to another embodiment of the present invention with the cover portion thereof removed.

A schematic perspective view of this embodiment is shown in FIG. 16. The reference numerals given in FIG. 16 are similar in significance to those given in FIG. 2 and therefore need not be described in detail.

In the present embodiment, the platen 203 is made movable from its position opposed to the recording head 101 by a driving portion, not shown. That is, as will be described later, in the present embodiment, the ink absorbing member 235 is designed so as to be capable of appropriately replacing the platen 203 in position in response to movement of the platen and being opposed or joined to the discharge ports of the recording head 101 for use in the discharge restoring operation of the recording head 101. Thereby the ink from the recording head 101 has been appropriately collected during recording.

Also, in the present embodiment, the ink absorbing member 235 is disposed below the platen 203 integrally with the ink tank 231.

The present embodiment will be described in greater detail.

FIG. 17 shows an example of the construction of the essential portions of the present invention. In FIG. 17, the reference numeral 234 designates a cartridge containing therein the ink tank 231 and the ink absorbing member 235 as a unit, and the reference character 234A denotes a joint for connecting the ink tank 231 to the supply tube 233. The reference characters 203A and 203B designate platen members adapted to form the platen 203 in their joined state (the state in which they cover the upper surface of the ink absorbing member 235). The platen members 203A and 203B are connected, for example, integrally to the cartridge 234 through a link 241 and are made pivotable about pivots on the cartridge 234 in a direction to uncover the upper surface of the ink absorbing member 235 and a direction to cover the upper surface of the ink absorbing member 235. For example, the link 241 and the cartridge 234 might be connected together by a tension spring so that when no extraneous force is applied, the platen members 203A and 203B might be pivotally moved in the direction to cover the upper surface of the ink absorbing member 235. These platen members may function as a protective member for protecting the ink absorbing member. Also, the pivots of the platen members 203A and 203B by the link 245 might be appropriately determined so that the platen members 203A and 203B might normally cover the upper surface of the ink absorbing member 235, or there has been no problem even when a spring has been combined therewith.

In the present embodiment, the cartridge 234 on which the platen members 203A and 203B are mounted has been made movable in the vertical direction of arrow B by a suitable driving member. Also, the link 241 has been provided with an opening-closing shaft 241A which comes into engagement with a member fixed to the apparatus by the upward displacement of the cartridge 234 by the driving member 248 and opens the platen members 203A and 203B with said engagement. Further, the cartridge 234 has been made removably mountable with respect to the apparatus so that the ink tank 231 and the ink absorbing member 235 can be interchanged as a unit. The direction in which the ink cartridge 234 is taken out could be, for example, the lengthwise direction thereof as indicated by arrow A. The platen members 203A and 203B are engaged with the cartridge 234 through the link 241.

The operation of the construction of FIG. 17 will now be described with reference to FIGS. 18A and 18B. In these figures, the reference numeral 245 designates a fixed wall which is fixed to the apparatus and serves as an engagement member engageable with the opening-closing shaft. The reference numeral 248 denotes a cam as a driving member having an arm portion 248B engaged with the bottom surface of the cartridge 234 and pivotable about a pivot 248A fixed to the apparatus. Also, the other arm portion 248C of the cam 248A has been coupled to drive means such as a motor or a solenoid through a suitable transmission mechanism so that during the discharge restoring operation, the drive means may be driven to thereby move the cartridge 234 upwardly.

Figure 18A:
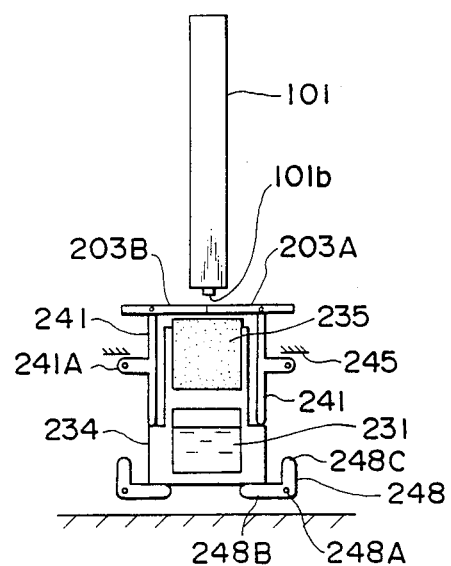
FIGS. 18A and 18B are side views for illustrating the operation of the embodiment shown in FIG. 17.

That is, as shown in FIG. 18A, when the cartridge 234 is held in its lower position during recording, the fixed wall 245 and the opening-closing shaft 241A are not in engagement with each other in this state. Therefore, the platen members 203A and 203B are in a position wherein they abut with each other and cover the ink absorbing member 235, so that they restrict the recording surface of the recording medium in opposed relationship with the discharge ports of the recording head 101.

Figure 18B:
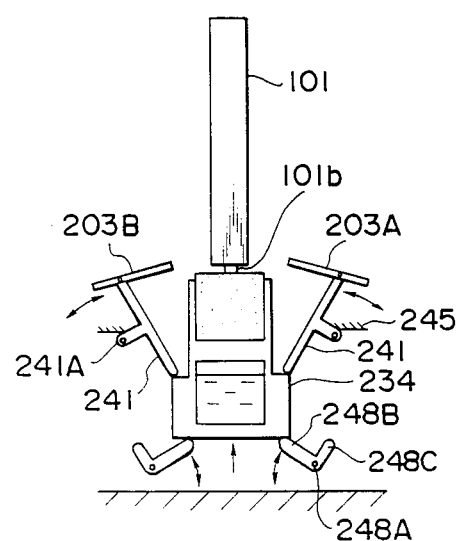

In contrast, design has been made such that when the end surface of the recording head 101 including the discharge ports 101b is to be cleaned, the drive means is appropriately driven so that the arm portion 248B of the cam 248 pushes the cartridge 234 upwardly. Along with this, the shaft 241A has come into engagement with the fixed wall 245 and the platen members 203A and 203B have been pivotally moved in the direction to uncover the upper surface of the ink absorbing member 235 while, at the same time, the ink absorbing member 235 has been joined to the discharge ports of the recording head 101. Thus, the ink, etc. adhering to the end surface of the discharge ports have been immediately absorbed by the ink absorbing member 235 and the restoration of discharge by cleaning has been accomplished.

Where a motor is used as the drive means for the cam 248, if the angle of revolution of the motor is appropriately controlled to thereby position the cartridge 234 at a position between the positions shown in FIGS. 18A and 18B, the upper surface of the ink absorbing member 235 is uncovered and becomes opposed to the recording head 101 with a proper distance kept therebetween. Therefore, the elimination of the desiccation and clogging of the ink near the discharge ports 101b, the elimination of bubbles mixed with the ink, or the discharge for replacing the viscosity-increased ink with fresh ink (the preliminary discharge) has become possible, and the discharge restoring operation by the preliminary discharge could be performed.

If, with such absorption of the ink from the recording head 101 being taken into account, the absorbing capacity of the ink absorbing member 235 (the amount of ink which can be absorbed by the ink absorbing member) is set to a value greater than the initial amount of ink in the ink tank 231, it has been possible without any special means for detecting the amount of ink in the ink absorbing member being provided to prevent the inconvenience that the ink which could not be completely absorbed by the ink absorbing member 235 leaks therefrom to contaminate various parts in the apparatus or the cartridge 234 is interchanged with unused ink left therein. Of course, this is also applicable to the ink absorbing member shown in the aforedescribed embodiment.

Also, during the removal of the cartridge 234, the platen members 203A and 203B have provided a lid member for covering the ink absorbing member 235 and thus, the ink has not contaminated the operator's hand or the like during the interchange of the cartridge.

Again in the present embodiment, the platen 203 has been constructed of the two members 203A and 203B and design has been made such that these platen members are dashed against each other and joined together during recording. Therefore, when the recording medium has been conveyed, there have been cases where the movement of the leading edge of the recording medium is hampered in the dashing portion to cause a jam. However, again in the present embodiment, such a problem could be solved by the application of the construction shown in FIGS. 10A and 10B.

In the present embodiment, in the ink system, the recording head 101 is disposed on the upper unit 1a side and the ink tank 231 is disposed on the lower unit 1b side and they are communicated with each other through the supply tube 233. It has been preferable that, as previously described, a pivotable ink joint member be provided, for example, in at least one of the connecting portion between the recording head 101 and the ink supply tube 233 and the connecting portion between the ink tank 231 and the ink supply tube 233 so that the displacement resulting from the vertical movement of the cartridge 234 may be absorbed by the pivotable ink joint. Also, instead of the flexible supply tube 233, use might safely be made of a supply tube comprising two relative rigid tube members coupled together through retractile bellows.

While Embodiment 1 has been described with respect to a case where the present invention is applied to an ink jet recording apparatus having an on-demand type recording head using a discharge energy generating member represented by an electro-thermal converting element and having discharge ports disposed downwardly, the present invention is, of course, effectively and readily applicable also to recording apparatuses adopting various drive systems and arrangements.

Description will now be made of a case where image reading means is provided in the recording apparatus of the present invention.

EMBODIMENT 2

Embodiment 2 will hereinafter be described in detail with reference to the drawings.

Figure 20:
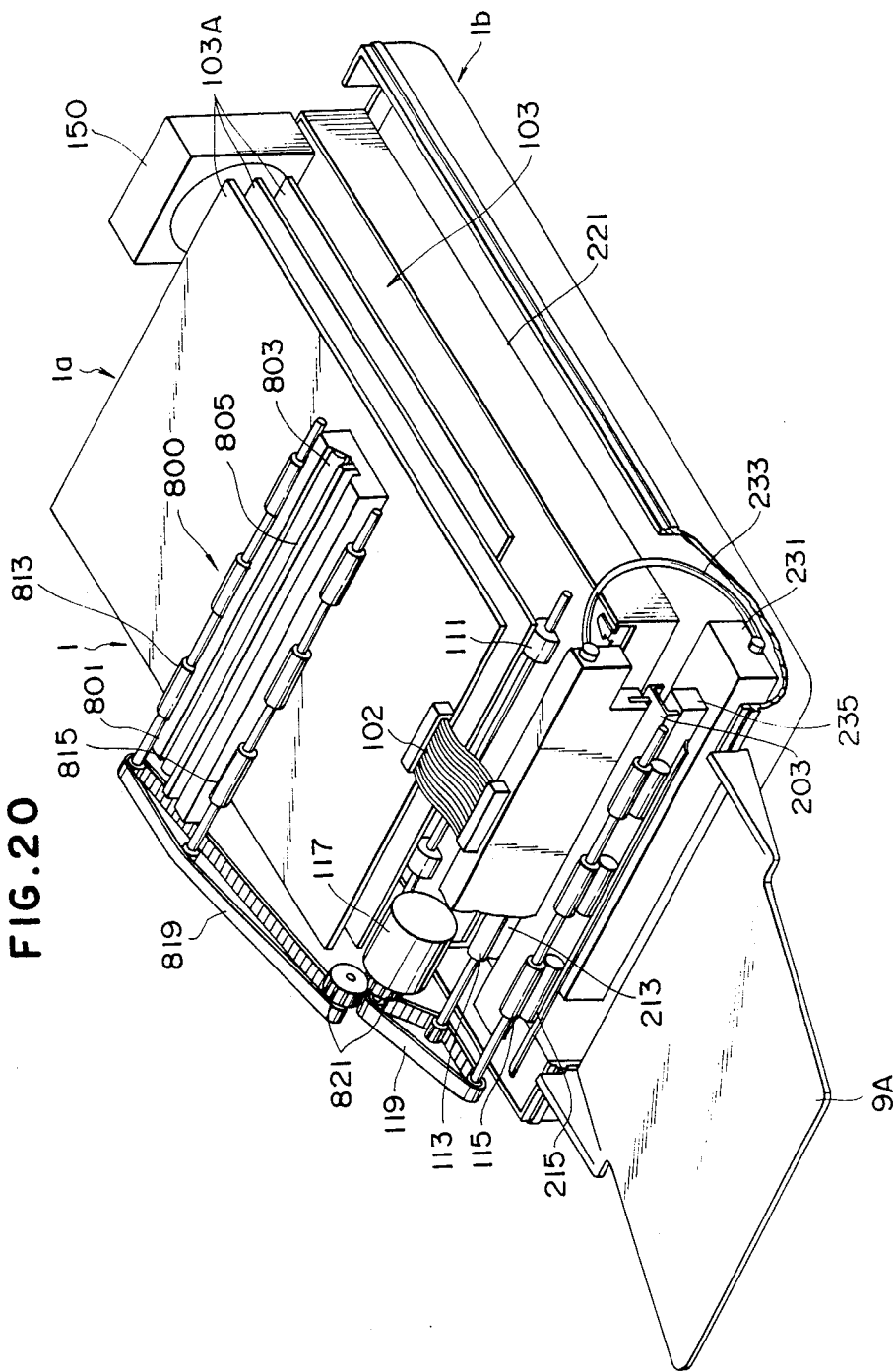
FIG. 20 is a perspective view showing the apparatus according to Embodiment 2 with the cover portion thereof removed.

FIG. 19 is a perspective view showing an example of the outer construction of a recording apparatus provided with image reading means, and FIG. 20 is a perspective view showing the recording apparatus with its outer cover removed for convenience.

In FIGS. 19 and 20, the reference numeral 1 designates a body unit portion having an upper unit 1a as a first unit and a lower unit 1b as a second unit. The upper unit 1a has been made pivotable up and down about a hinge 11 relative to the lower unit 1b. The upper unit 1a is provided with a recording head 101, an electric circuit portion 103, a fan 150, an upper discharge roller 115a, an upper conveyor roller 113a, a paper guide 201 and a paper supply roller 111 which will be described later. On the other hand, the lower unit 1b is provided with a platen 203, an ink absorbing member 235, an ink tank 231, a paper cassette 221, a paper discharge tray 9A and idlers 213, 215. The reference numeral 5 denotes a cover disposed over the body unit portion 1. The cover 5 has an operating portion 7 in which are disposed various command switches 7a and 7b such as on-line switches and a display device 7c for effecting the mode display, and in addition, an insertion port 8A for a medium (an original) bearing image information to be read, and a discharge port 8B for the read original, and is provided with an original reading apparatus containing portion 8 which covers a reading apparatus to be described with reference to FIG. 20. The reference numeral 9 designates a discharge port provided in one side of the apparatus. Recording mediums S on which recording has been effected may be piled on the discharge tray 9A through the discharge port 9.

Figure 21:
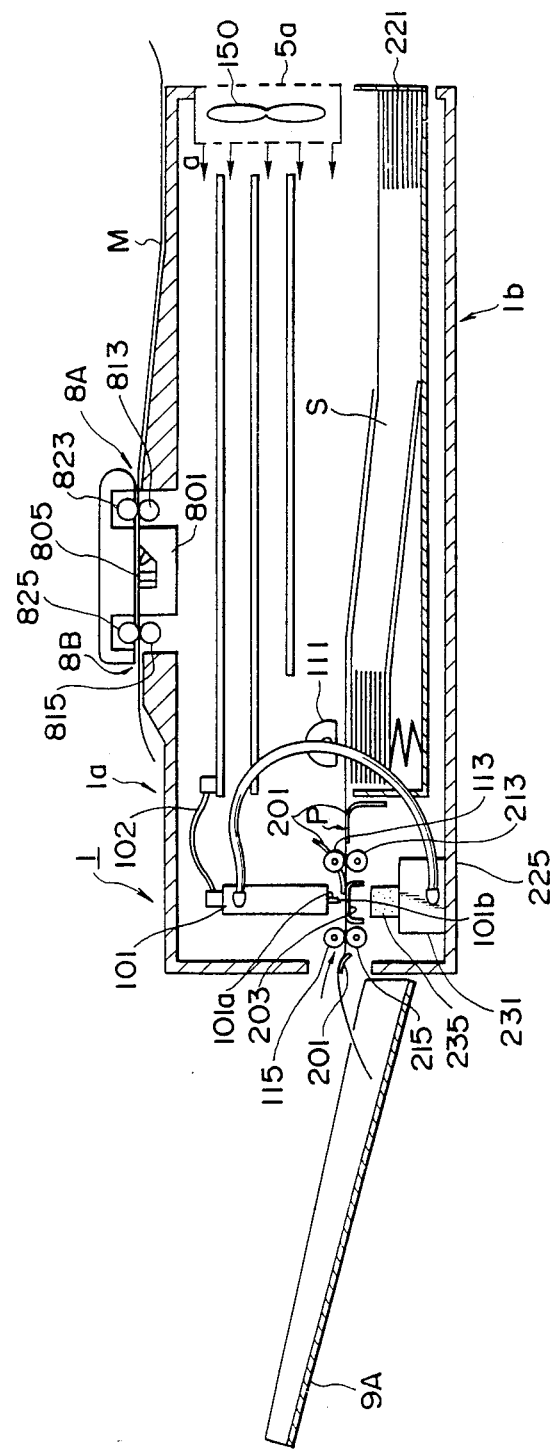
FIG. 21 is a side sectional view of the apparatus according to Embodiment 2.

FIG. 20 is a perspective view showing a state in which the cover 5 of the apparatus shown in FIG. 19 has been removed to illustrate the interior construction of the FIG. 19 apparatus, and FIG. 21 shows a side cross-section of the apparatus shown in FIG. 19. In these figures, the reference numeral 101 designates an image processing head disposed near the discharge port 9. The image processing head 101 is in the form of the so-called full multi-type wherein nozzles 101a are arranged, for example, at a density of 16 nozzles per 1 mm, over a range corresponding to the full recording width (e.g. recording paper of format A4) of the present apparatus. Also, discharge energy generating members represented by electro-mechanical converting elements (not shown) or electro-thermal converting elements (not shown) are disposed at appropriate locations in the ink flow paths such as the nozzles and discharge energy has been caused to act on ink in response to the supply of a driving signal corresponding to an image to be recorded (i.e., a driving signal corresponding to the reading signal of an original reading apparatus 800), whereby ink has been discharged from the discharge ports 101b. In the present embodiment, the recording head 101 is provided in such a manner that the discharge port 101b of each nozzle 101a opens vertically downwardly.

The reference numeral 103 denotes the main electric circuit portion of the present apparatus in which a driver circuit for driving the recording head 101 through a flexible cable 102, a driver circuit for the original reading apparatus 800, a signal processing circuit, a power source circuit, a control circuit, an interface circuit with the various circuits in the apparatus, etc. are provided on a base plate 103A. In the present embodiment, the main electric circuit portion 103 is provided in the upper unit 1a in common with the recording head 101 and therefore, even if the ink discharge during recording or unexpected leakage of ink has occurred, the ink has not exerted any influence upon the electric circuit portion 103. That is, even if the ink leaks out of the discharge ports 101b, the flow path thereof is formed on the lower unit 1b side and thus, in the present embodiment, by the electric circuit portion 103 being disposed above the flow path, the ink has exerted no influence upon the main electric circuit portion 103. Further, in the present embodiment, the electric circuit portion 103 is disposed at a level higher than the positions at which the discharge ports 101b of the recording head 101 are disposed. Thus, it has become more difficult for the ink to exert an influence upon the electric circuit portion 103. The above-described arrangement of the electric circuit portion 103 and the discharge ports 101b has been a preferable arrangement, but has not always been necessary.

The reference numeral 111 designates a paper supply roller formed by cutting away a part of an arc. The paper supply roller 111 is a roller for supplying recording mediums S such as paper, films or cloths from a cassette 221 containing the recording mediums S therein toward the recording station in which recording is effected by the recording head 101.

The reference numerals 113 and 115 respectively denote a conveyor roller disposed at the upstream side on a recording medium conveyance path P with respect to the recording station and a discharge roller disposed near the discharge port 9 at the downstream side. These rollers 113 and 115 are adapted to be rotatively driven by a motor 117 through a timing belt 119. Thus, in response to this rotative drive, the conveyor roller 113 and the discharge roller 115 have cooperated with idlers 213 and 215 disposed in opposed relationship therewith to effect the conveyance of the recording medium S to the recording station with the recording medium S held therebetween or the discharge of the recording medium S from the recording station to the discharge tray 9A.

The reference numeral 201 designates a paper guide provided on the conveyance path P of the recording mediums S to restrict the conveyance path P, and the reference numeral 203 denotes a platen provided on the lower unit 1b side in opposed relationship with the discharge ports 101b of the recording head 101 to maintain the recording medium S in the recording station, that is, control the recording surface, when recording is effected on the recording medium S by the recording head 101.

The recording mediums S piled in the aforementioned paper cassette 221 are separated one by one by the paper supply roller 111 through the cooperation thereof with separating means (not shown) and conveyed toward the recording station. The reference numeral 225 designates the bottom plate of the apparatus. In the present embodiment, this bottom plate 225 has served also as a partition wall for blocking the outflow of leaking ink to the outside of the apparatus when unexpected leakage of ink from the recording head 101, etc. has occurred.

The reference numeral 231 denotes an ink tank as an ink supply source to the recording head 101. The ink tank 231 is disposed below the platen 203 and designed to supply ink to the recording head 101 through a flexible supply tube 233. The reference numeral 235 designates an ink absorbing member formed of a water-absorbent porous material. In the present embodiment, the ink absorbing member 235 is disposed on top of the ink tank 231 below the platen 203. As in Embodiment 1, this ink absorbing member 235 might appropriately replace the platen 203 in position and be constructed so as to be capable of opposing or bearing against the discharge ports 101b of the recording head 101 and to be used for the discharge restoring operation or the capping operation of the recording head 101. Thereby, the ink dripping from the recording head 101 could be appropriately collected.

The reference numeral 150 designates a fan for introducing air from outside of the apparatus to thereby cool the various portions of the apparatus. In the present embodiment, this fan 150 has been disposed on that side of the apparatus which is opposite to the discharge port 9, whereby the air stream (indicated by arrows a in FIG. 20) from an air intake port 5a in said side to the discharge port 9 has been produced. As described above, in the present embodiment, the recording head 101 has been provided near the discharge port 9 and therefore, the satellite which may secondarily occur during the discharge of ink droplets from the recording head 101, the ink mist which may be caused on the surface of the recording medium S by the scattering of ink, dust, the paper powder of the recording medium, etc. have been immediately carried out of the apparatus through the discharge port 9 by riding on the air stream. Thereby, they are prevented from adhering to various parts in the apparatus including the original reading apparatus 800 to contaminate them or break down the electric circuit portion 103. In the present embodiment, the cooling fan 150 for cooling the electric circuit has also been used as blower means in the apparatus which eliminates the ink mist.

The reference numeral 800 denotes an original reading apparatus disposed above the electric circuit portion 103. The original reading apparatus 800 has a sensor unit 801 for reading image information (for example, a contact sensor unit as shown), an original feeding roller 813 for feeding an original M inserted into the insertion port 8A toward the sensor unit 801, and an original discharging roller 815 for discharging the read original M from the discharge port 8B.

The sensor unit 801 is provided with an illuminating device 803 for illuminating the position at which the original conveyed between the rollers 813 and 815 is read, and a line sensor 805 in which light-receiving elements are arranged so that one-line reading can be accomplished over the full width of the original. The image information read thereby has been directed to a suitable processing circuit provided in the electric circuit portion 103, and the recording head 101 has been driven for the thus processed image information, whereby image formation could be accomplished. The rollers 813 and 815 in the original reading apparatus are coupled to and driven by the motor 117 through a transmission mechanism including a timing belt 819 and a gear 821 and are designed to cooperate with idlers 823 and 825 disposed in opposed relationship with the respective rollers to convey the original.

In addition to the above-described construction, in the present embodiment, the body unit portion 1 is made separable into the upper unit 1a and the lower unit 1b as will be described below to facilitate repairs of various parts and jam treatment.

Figure 22:
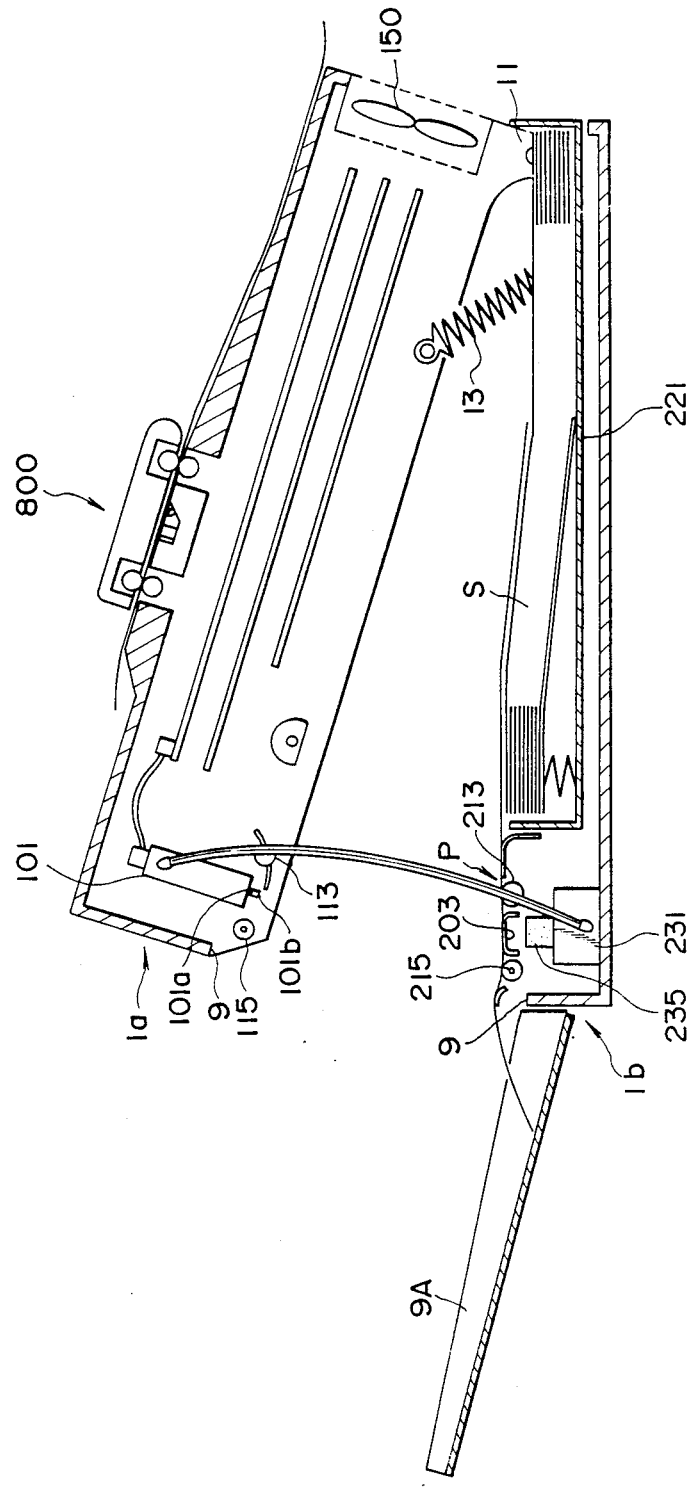
FIG. 22 is a side sectional view showing the apparatus according to Embodiment 2 with the body unit portion and the paper supply portion thereof separated from each other.

FIG. 22 shows an example of the construction of a mechanism for separating the upper unit 1a and the lower unit 1b from each other and opening the interior of the apparatus to thereby secure a space available for said works. In FIG. 22, the reference numeral 11 designates a hinge disposed on the side opposite to the discharge port 9 to permit pivotal movement of the upper unit 1a relative to the lower unit 1b, and the reference numeral 13 denotes a spring for holding the upper unit 1a in its opened position.

In the present embodiment, as described above, the recording head 101, the rollers 113 and 115, etc. are disposed near the discharge port 9 in the upper unit 1a, and the platen 203, the idlers 213, 215, the paper cassette 221, the ink tank 231 and the ink absorbing member 235 are disposed near the discharge port 9 in the lower unit 1b and thus, design is made such that in the opened state of the body unit portion 1 as shown in FIG. 22, the ink system including the recording head 101, the ink tank 231 and the ink absorbing member 235 and the paper supplying or conveying system including the paper cassette 221 and the various roller members are widely opened.

That is, in the present embodiment, the upper unit 1a and the lower unit 1b become spaced apart from each other along a path along which the recording medium S is fed out from the cassette 221 to the discharge port 9 and therefore, when the upper unit 1a has been pivoted upwardly relative to the lower unit 1b, the conveyance path has been opened.

Accordingly, the work space required for repairs of various parts, interchange of the ink absorbing member and jam eliminating process has been secured in this state. Thus work has become easy. Also, replenishment of recording mediums S and supply of ink might be effected in this state. The present embodiment has been shown with respect to an example in which the upper and lower units are spaced apart and opened along the entire conveyance path of the recording medium S, whereas this is not restrictive. The above-described effect could be attained by making design such that at least the portion of the recording station by the recording head is spaced apart and opened.

The construction for thus securing the work space is not limited to that shown in FIG. 22, but could be various. For example, suitable struts for supporting the upper unit 1a might be provided at four corners of the lower unit 1b and the upper unit 1a might be made vertically movable along those struts, or the upper unit 1a might be slid obliquely upwardly in its horizontal state by the use of a parallel link mechanism, or the direction in which the upper unit 1a and the lower unit 1b are opened is not limited to the vertical direction, but for example, the upper unit and the lower unit might be opened in the horizontal direction.

Now, in the present embodiment, in the ink system, the recording head 101 has been disposed on the upper unit 1a side and the ink tank 231 has been disposed on the lower unit 1b side, and they have been designed to communicate with each other through a supply tube 233.

Again in the present embodiment, the supply tube 233 could be connected by the use of the connecting method as described in Embodiment 1 with reference to FIGS. 5A and 5B.

Figure 23A:
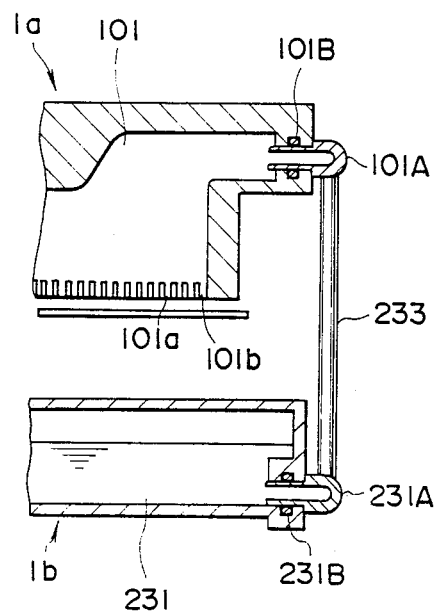

This portion is shown in FIGS. 23A and 23B, but the construction, etc. thereof has been described in detail in Embodiment 1 with reference to FIGS. 5A and 5B and therefore, the details thereof including the effect thereof need not be described.

Now, in ink jet recording, the distance of flight of ink droplet, i.e., the distance between the nozzle opening portion of the recording head 101 and the paper, is one of the factors which greatly influence the quality of recording, as previously described. Again in the present embodiment, as in Embodiment 1, the upper unit 1a having the recording head 101 and the lower unit 1b having the platen 203 for controlling the paper can be spaced apart from each other. Therefore, it is desirable to give consideration so that in the joined state of the units, the recording head and the platen are accurately opposed to each other in parallel relationship with each other.

To realize this, it has been conceived, for example, to hold the recording head 101 so as to be vertically movable relative to the frame of the upper unit 1a, and cause a dashing member fixed to the platen 203 of the lower unit 1b to strike against a portion of the recording head in the joined state of the upper and lower units.

In the present embodiment, to realize this compactly and simply, design has been made such that the recording head 101 is fixed to the upper unit 1a and the platen 203 is fixed to the lower unit 1b and in the joined state of the upper and lower units 1a and 1b, dashing members (not shown) provided in the upper and lower units are caused to strike against two points near the opposite ends of the recording head 101. Also, it has been more preferable to provide suitable lock means to secure said joined state.

According to this, it has become possible to simply keep a highly accurate and well-reproducible distance between the recording head and the paper during the opening-closing of the upper and lower units 1a and 1b by accurately controlling the mounting dimensions of the recording head 101 or the platen 203 relative to the dashing members of the upper and lower units 1a and 1b.

In the recording apparatus according to the present embodiment as described above, the original reading means has been disposed integrally with the recording means at an appropriate location, i.e., above the electric circuit portion, whereby a system construction of compact size and high operability has become possible.

Also, the on-demand type recording head 101 has been disposed near the discharge port 9 of the apparatus with the discharge ports thereof facing vertically downwardly and the paper cassette 221 has been disposed below the electric circuit portion 103 so that a recording medium conveyance path including the platen 203 is formed below the discharge ports of the recording head. Therefore, the conveyance distance of the recording medium has been shortened and the conveying system has been simplified and accordingly, the construction of the apparatus could be made very compact.

Also, the original reading apparatus and the main electric circuit portion 103 have been provided on the upper unit 1a side in common with the recording head 101 and therefore, even when the ink has been discharged or when leakage of the ink has occurred, the ink has not adversely affected the original reading apparatus 800 and the electric circuit portion 103.

In addition, the internal pressure of the apparatus has been made higher than the atmospheric pressure so that there is formed an air stream flowing out through the discharge port 9, whereby the ink mist produced during the discharge of ink droplets by the head 101 provided near the discharge port 9 and the paper powder or the like produced by the conveyance of the recording medium have been quickly carried out of the apparatus. Thus, the contamination or accident which would otherwise result from the adherence of the ink to the various parts in the apparatus including the original reading apparatus 800 has been reliably prevented.

Furthermore, the upper unit 1a has been made pivotable relative to the lower unit 1b by the hinge 11 disposed on the side opposite to the discharge port 9, whereby during the pivotal movement thereof, the ink system and the conveying system have been widely opened and accordingly, the work required for the repairs of various parts and the jam treatment has become easy.

While the present embodiment, like Embodiment 1, has been described with respect to a case where the present invention is applied to a recording apparatus having an on-demand type and full multi-type recording head using an electro-mechanical converting element or an electro-thermal converting element as a discharge energy generating member, the present invention is, of course, applicable also to recording apparatuses adopting various drive systems and scanning systems.

Also, compactness of various parts including the conveying system has been contrived by providing the recording head near the discharge port, but the location at which the recording head is disposed has not been limited to the vicinity of the discharge port. In such a case, an outflow port for air could be provided separately near the recording head so that ink mist, etc. might be rapidly discharged.

The construction of the original reading apparatus 800 is not restricted to the above-described example, but for example, even a construction using an optical system can be commonly used as viewed in terms of manufacturing cost or the like. Although, this is partly contradictory in respect of further compactness.

Further, in addition to the original reading apparatus 800, there may be separately provided a host apparatus as an image information supply source.

It will be appreciated that the various modes described in Embodiment 1 are of course applicable to the portion of the present embodiment which serves to record.

As described above, a recording apparatus which is compact and improved in the operability of maintenance and jam treatment can be realized by the present invention.

Also, since the ink supply tube is made displaceable, the opening of the first and second units can be allowed without involving the separation of the ink supplying system. For example, as in the above-described embodiment, an appropriate construction becomes possible in which the ink tank and the recording unit are disposed in the lower unit and the upper unit, respectively.

Also, an ink jet recording apparatus in which various parts of the apparatus including an electric circuit can be reliably protected from ink mist or the like can be realized by the present invention.

In addition, according to the present invention, a large work space can be secured for the recording head without involving great displacement of the platen and therefore, an ink jet recording apparatus which is compact and easy in the discharge restoring operation can be realized. Also, the present invention can provide an apparatus which is not only compact, but also high in reliability because there is no movement or displacement of ink supply means and signal transmitting members associated with the recording head, as compared with an apparatus designed such that the recording head is moved relative to the platen to thereby secure the work space.

Also, according to the present invention, the platen and the restoring member are operatively associated with each other and the access thereof to the recording head is made possible by appropriately substituting the position thereof and therefore, a simple and reliable discharge restoring operation becomes possible without involving great displacement thereof.

Further, according to the present invention, the platen and the restoring member are operatively associated with each other so that the access thereof to the recording head can be accomplished by appropriately substituting the position thereof. Therefore, simple and reliable discharge restoration becomes possible without requiring great displacement thereof, and the restoring member and the ink tank are made therefore. Thus, interchanging work becomes simple and saving of the space can be achieved. Further, if the platen also is made unitary as in the above-described embodiment, the platen serves as a lid member for the restoring member and therefore, the undesirable possibility of the operator's hand or the like being contaminated during interchange is eliminated.

According to the present invention, the reading means is made integral with the recording means and an ink jet recording apparatus is used as the recording means and therefore, it is possible to make the most of the advantage thereof, and an image processing apparatus which is compact and high in operability can be realized. Also, the separability and openability of the two units can improve the operability of maintenance and jam treatment. In addition, the ink supply tube is made displaceable. Therefore, the separation and opening of the units can be allowed without involving the separation of the ink supplying system and for example, as in the above-described embodiment, it becomes possible to provide an appropriate construction in which the ink tank is disposed in the lower portion and the recording head and the reading apparatus are disposed in the upper portion.

We claim:

1. A recording apparatus including:
   recording means for discharging ink for effecting recording on a recording medium in response to information;
   electric circuit means;
   an upper unit having said recording means and having at least a portion of said electric circuit means of said recording apparatus;
   a lower unit having a platen for maintaining the recording medium in a recording station for effecting recording thereon by said recording means and a position connecting said upper unit and said lower unit being located at the recording station; and
   conveying means for conveying the recording medium to the recording station and allowing the recording medium to be conveyed along the position connecting said upper unit and said lower unit at the recording station;
   said upper unit and said lower unit being capable of being opened and spaced apart from each other at the position connecting said upper unit and said lower unit at the recording station.

2. A recording apparatus according to claim 1, wherein said recording means includes a recording head having vertically downwardly open ink discharge ports for discharging the ink and at least a portion of said electric circuit means is disposed at a level higher than the discharge ports with respect to the vertical direction.

3. A recording apparatus according to claim 1, wherein said recording means is provided in the vicinity of an exit port through which a recording medium on which recording has been effected exits and said recording means has discharge ports for discharging ink therethrough located at the recording station and arranged over a range corresponding to the width of the recording medium.

4. A recording apparatus according to claim 1, and further including a recording medium supplying system for supplying the recording medium under said conveying means disposed in said lower unit.

5. A recording apparatus according to claim 1, wherein said upper unit further includes reading means for reading image information from a medium bearing an image and applying an image signal to said electric circuit means.

6. A recording apparatus according to claim 5, wherein said recording means includes a recording head having vertically downwardly open ink discharge ports and at least a portion of said electric circuit means is disposed at a level higher than the discharge ports with respect to the vertical direction.

7. A recording apparatus according to claim 5, wherein said recording means is provided in the vicinity of an exit port through which a recording medium on which recording has been effected exits and said recording means has discharge ports for discharging ink therethrough located at the recording station and arranged over a range corresponding to the width of the recording medium.

8. A recording apparatus according to claim 5, and further including a recording medium supplying system for supplying the recording medium under said conveying means disposed in said lower unit.

9. A recording apparatus according to claim 5, wherein said upper unit further includes blower means for introducing air into said recording apparatus.

10. A recording apparatus according to claim 9, further including an opening for directing the introduced air to the outside of the apparatus formed between said upper unit and said lower unit.

11. A recording apparatus according to claim 1, wherein said upper unit further includes blower means for introducing air into said recording apparatus.

12. A recording apparatus according to claim 11, further including an opening for directing the introduced air to the outside of the apparatus formed between said upper unit and said lower unit.

13. A recording apparatus according to claim 1, wherein said recording means includes an electrothermal converter for generating energy utilized for discharging ink.

14. A recording apparatus comprising:
a first unit having recording means provided with an ink discharge port for discharging ink for effecting recording on a recording medium in response to information;
a second unit having a platen for supporting the recording medium at a recording station where said recording means records and ink storing means storing therein ink to be supplied to said recording means;
conveying means for conveying said recording medium to said recording station, said conveying means being defined at a position where said first unit is connected to said second unit; and
an ink supply and connecting member for supplying ink from said ink storing means to said recording means, said ink supply and connecting member being shiftable at an attaching section of at least one of said first unit and said second units;
said first unit and said second unit being capable of being opened and spaced apart from each other at the recording station.

15. A recording apparatus according to claim 14, wherein said ink supply and connecting member further includes a flexible ink supply tube and a pivotable joint member is provided in at least one of the connecting portion between said ink supply tube and said ink storing means and the connecting portion between said ink supply tube and said recording means.

16. A recording apparatus according to claim 14, wherein said first unit further includes blower means for introducing air into the apparatus.

17. A recording apparatus according to claim 16, further including an opening for directing the introduced air to the outside of the apparatus formed between said first unit and said second unit.

18. A recording apparatus according to claim 14, wherein said first unit further includes reading means for reading image information from a medium bearing an image and applying an image signal to electric circuit means.

19. A recording apparatus according to claim 18, wherein said ink supply and connecting member further includes a flexible ink supply tube and a pivotable joint is provided in at least one of the connecting portion between said ink supply tube and said ink storing means and the connecting portion between said ink supply tube and said recording means.

20. A recording apparatus according to claim 18, wherein said first unit further includes blower means for introducing air into the apparatus.

21. A recording apparatus according to claim 20, further including an opening for directing the introduced air to the outside of the apparatus.

22. A recording apparatus according to claim 14, further including a holding member and wherein said platen is retained by said holding member in said ink storing means and has a unitary structure.

23. A recording apparatus according to claim 22, wherein said unitary structure is an ink cartridge provided with ink storing means, a platen movably held by said holding member and a receiving member for receiving ink disposed at a location capable of being covered by said platen.

24. A recording apparatus according to claim 23, wherein said platen is divisible into at least two members, each of which is connected to said holding member, said at least two members covering said receiving member.

25. A recording apparatus according to claim 14, wherein said ink storing means further includes a receiving member for receiving ink.

26. A recording apparatus according to claim 14, wherein said recording means includes an electrothermal converter for generating energy utilized for discharging ink.

27. A recording apparatus comprising:
a recording head having a discharge port for discharging ink therethrough;
a first opening for introducing air into said recording apparatus;
a second opening for directing said introduced air outside of the apparatus, said second opening being provided in the vicinity of said recording head; and
blower means for introducing air into and directing air out of said recording apparatus.

28. A recording apparatus according to claim 27, wherein said blower means includes a fan for introducing the air and a member for directing the introduced air to said recording head and said second opening is provided near said recording head and above a containing member containing therein parts of said recording apparatus including said recording head.

29. A recording apparatus according to claim 28, wherein said containing member is a member which covers various parts including a driving circuit for driving said recording head and a conveying system for conveying a recording medium and said blower means is used as pressurizing means for cooling the various parts.

30. A recording apparatus according to claim 28, wherein said containing member includes an exit port for exiting a recording medium on which recording has been effected by a conveying system, the exit port being used also as said second opening.

31. A recording apparatus according to claim 27, wherein said recording head includes an electrothermal converter for generating energy utilized for discharging ink.

32. A recording apparatus comprising:
a recording head on which discharge ports for discharging ink therethrough are arranged;
a platen movable between a recording position opposed to the discharge ports and a position apart from the recording position;
holding means for holding said movable platen; and
drive means for imparting a driving force for driving said holding means to move said platen.

33. A recording apparatus according to claim 32, wherein said platen includes two joinable and separable members extending in the direction of arrangement of the discharge ports and is defined at the recording position by said two members and said holding means has a transmission mechanism for moving said two members in different directions to thereby effect said joining and separation.

34. A recording apparatus according to claim 33, wherein said transmission mechanism moves said two members in pivotal movement.

35. A recording apparatus according to claim 32, wherein said holding means includes a member for separably holding said platen in a direction orthogonal to the direction of arrangement of the discharge ports.

36. A recording apparatus according to claim 32, wherein said recording head includes an electrothermal converter for generating energy utilized for discharging ink.

37. A recording apparatus comprising:
a recording head on which discharge ports for discharging ink therethrough are arranged;
a platen movable between a recording position opposed to the discharge ports and a position apart from the recording position;
an opposing member capable of being opposed close to said discharge ports and capable of being connected to said discharge ports; and
holding means for holding said movable platen and opposing said opposing member to the discharge ports with respect to movement of said platen.

38. A recording apparatus according to claim 37, wherein said opposing member includes an absorbing member proximate to said discharge ports for receiving ink from the discharge ports.

39. A recording apparatus according to claim 37, wherein said opposing member includes a cap member joinable to the discharge ports for protecting the discharge ports.

40. A recording apparatus according to claim 37, wherein said opposing member is positioned on a side opposite to the discharge ports with said platen interposed therebetween during recording.

41. A recording apparatus according to claim 37, wherein said platen includes two joinable and separable members extending in the direction of arrangement of the discharge ports and is defined at the recording position by said two members and said holding member has a mechanism for pivotally moving said two members in different directions to thereby effect said joining and separation and moving said opposing member toward the discharge ports during said separation.

42. A recording apparatus according to claim 37, wherein said holding member includes a member for moving said platen in a direction orthogonal to the direction of arrangement of the discharge ports in a plane containing a recording surface and moving said opposing member toward the discharge ports during the moving of said platen.

43. A recording apparatus according to claim 37, wherein said recording head includes an electrothermal converter for generating energy utilized for discharging ink.

44. A recording apparatus comprising:
a recording head on which discharge ports for discharging ink therethrough are arranged;
a platen provided opposite the discharge ports;
storing means for storing ink to be supplied to said recording head;
a cartridge movably supporting said platen;
a receiving member for receiving ink from the discharge ports by connecting and closing the discharge ports; and
driving means for driving said cartridge to cause said platen to leave a position opposed to said recording head and cause said receiving member to be joined or proximate to the discharge ports.

45. A recording apparatus according to claim 44, wherein said platen includes two members joinable and separable to each other and is defined by joining said two members and wherein said receiving member is movably provided as a main body of said cartridge and at an opposite side of said platen than said recording head when said platen is defined by joining said two members.

46. A recording apparatus according to claim 44, wherein said receiving member includes an ink absorbing member having an ink absorbing capacity, the ink absorbing capacity being greater than an initial amount of ink in said storing means.

47. A recording apparatus according to claim 44, wherein said recording head includes an electrothermal converter for generating energy utilized for discharging ink.

48. A recording apparatus comprising:
a recording head having discharge ports for discharging ink therethrough;
a cartridge having a platen detachably mounted on said recording apparatus and movably held;
storing means storing therein ink to be supplied to said recording head;
a receiving member for receiving ink from the discharge ports by connecting the discharge ports; and
driving means for effecting a driving force for separating said platen of said cartridge from a position opposed to the discharge ports and moving said receiving member to a position at which said receiving member may be joined and separated from the discharge ports.

49. A recording apparatus according to claim 48, wherein said platen has two members and separable to each other and is defined by joining of said two members and said two members are retained by means for moving and separating said two members as said cartridge moves to the discharge ports, and wherein said receiving member is movably provided as a main body of said cartridge and located at the side of said platen opposite to said recording head.

50. A recording apparatus according to claim 48, wherein said receiving member includes an ink absorbing member having an ink absorbing capacity, the ink absorbing capacity being greater than an initial amount of ink in said storing means.

51. A recording apparatus according to claim 48, wherein said recording head includes an electrothermal converter for generating energy utilized for discharging ink.

52. An ink cartridge having an ink tank storing ink therein, a receiving member for receiving the ink, and a protective member movably supported by a supporting member and covering said receiving member.

53. An ink cartridge according to claim 52, wherein said protective member is a platen.

54. An ink cartridge according to claim 52, wherein said protective member is pivotable by said supporting member.

55. An ink cartridge according to claim 52, wherein said receiving member includes an ink absorbing member.

56. An ink cartridge according to claim 55, wherein said ink absorbing member has an absorbing capacity greater than the amount of ink stored in said ink tank.

57. An ink cartridge according to claim 52, wherein said protective member includes at least two members supported by said supporting member.

58. An ink cartridge according to claim 57, wherein said at least two members are of substantially equal size.

59. A recording apparatus according to claim 52, further including a recording head having an electrothermal converter for generating energy utilized for discharging ink.

* * * * *

UNITED STATES PATENT AND TRADEMARK OFFICE
CERTIFICATE OF CORRECTION

PATENT NO. : 4,893,137

DATED : January 9, 1990

INVENTOR(S) : Ryuichi Ebinuma et al.

It is certified that error appears in the above-identified patent and that said Letters Patent is hereby corrected as shown below:

COLUMN 32:

Line 63, "members and" should read --members joinable and--.

COLUMN 34:

Line 15, "59." should read --60.-- and "claim 52" should read --claim 59--; and

Line 19, insert --59. A recording apparatus provided with the ink cartridge of claim 52.--.

COLUMN 1:

Line 40, "ih" should read --in--.

COLUMN 2:

Line 10, "ih" should read --in--.

UNITED STATES PATENT AND TRADEMARK OFFICE
CERTIFICATE OF CORRECTION

PATENT NO. : 4,893,137
DATED : January 9, 1990
INVENTOR(S) : Ryuichi Ebinuma et al.

It is certified that error appears in the above-identified patent and that said Letters Patent is hereby corrected as shown below:

COLUMN 9:

Line 42, "the outside of apparatus" should read --outside of the apparatus--.

COLUMN 12:

Line 10, "blight" should read --flight--.
    Line 17, "head 1b" should read --unit 1b--.

COLUMN 18:

Line 1, "moveble" should read --movable--

COLUMN 19:

Line 44, "link 245" should read --link 241--.

COLUMN 21:

Line 29, "relative" should read --relatively--.
    Line 59, "115a, an upper conveyor roller 113a," should read --115, an upper conveyor roller 113,--

UNITED STATES PATENT AND TRADEMARK OFFICE
CERTIFICATE OF CORRECTION

PATENT NO. : 4,893,137

DATED : January 9, 1990

INVENTOR(S) : Ryuichi Ebinuma et al.

It is certified that error appears in the above-identified patent and that said Letters Patent is hereby corrected as shown below:

COLUMN 24
    Line 48, "works." should read --work.--.

COLUMN 25:
    Line 9, "Thus" should read --Thus,--.

COLUMN 27:

Line 13, "like. Although," should read --like, although--; and

Line 64, "therefore" should read --unitary.--.

Signed and Sealed this

Twenty-third Day of June, 1992

Attest:

DOUGLAS B. COMER

*Attesting Officer*     *Acting Commissioner of Patents and Trademarks*